United States Patent
Beasley

[11] Patent Number: 5,949,785
[45] Date of Patent: Sep. 7, 1999

[54] NETWORK ACCESS COMMUNICATIONS SYSTEM AND METHODOLOGY

[75] Inventor: James Beasley, Simi Valley, Calif.

[73] Assignee: Whittaker Corporation, Simi Valley, Calif.

[21] Appl. No.: 08/742,114

[22] Filed: Oct. 31, 1996

Related U.S. Application Data

[60] Provisional application No. 60/007,147, Nov. 1, 1995.

[51] Int. Cl.$^6$ .................................................. H04L 12/56

[52] U.S. Cl. ......................... 370/398; 370/395; 370/402; 370/466

[58] Field of Search ...................................... 370/395, 400, 370/401, 402, 466, 467, 438, 351, 244, 398, 437, 439

[56] References Cited

U.S. PATENT DOCUMENTS

| | | | |
|---|---|---|---|
| 5,526,344 | 6/1996 | Diaz et al. | 370/438 |
| 5,668,798 | 9/1997 | Toubol et al. | 370/244 |
| 5,742,760 | 4/1998 | Picazo, Jr. et al. | 370/351 |

*Primary Examiner*—Chi H. Pham
*Assistant Examiner*—Frank Duong
*Attorney, Agent, or Firm*—Sitrick & Sitrick

[57] ABSTRACT

A digital switching system is provided for coupling with one or more external specific physical interface data signal sources regardless of signal protocol, and includes input subsystems for receiving and processing the data signal sources into data cells, a data multiplexer for multiplexing the processed data, an addressable memory for storing the multiplexed data, a queue controller for creating and managing memory queues which store the multiplexed data, a data demultiplexer for demultiplexing the stored multiplexed data in response to the queue controller, and output processors for outputting the demultiplexed data.

40 Claims, 41 Drawing Sheets

FIG. 1

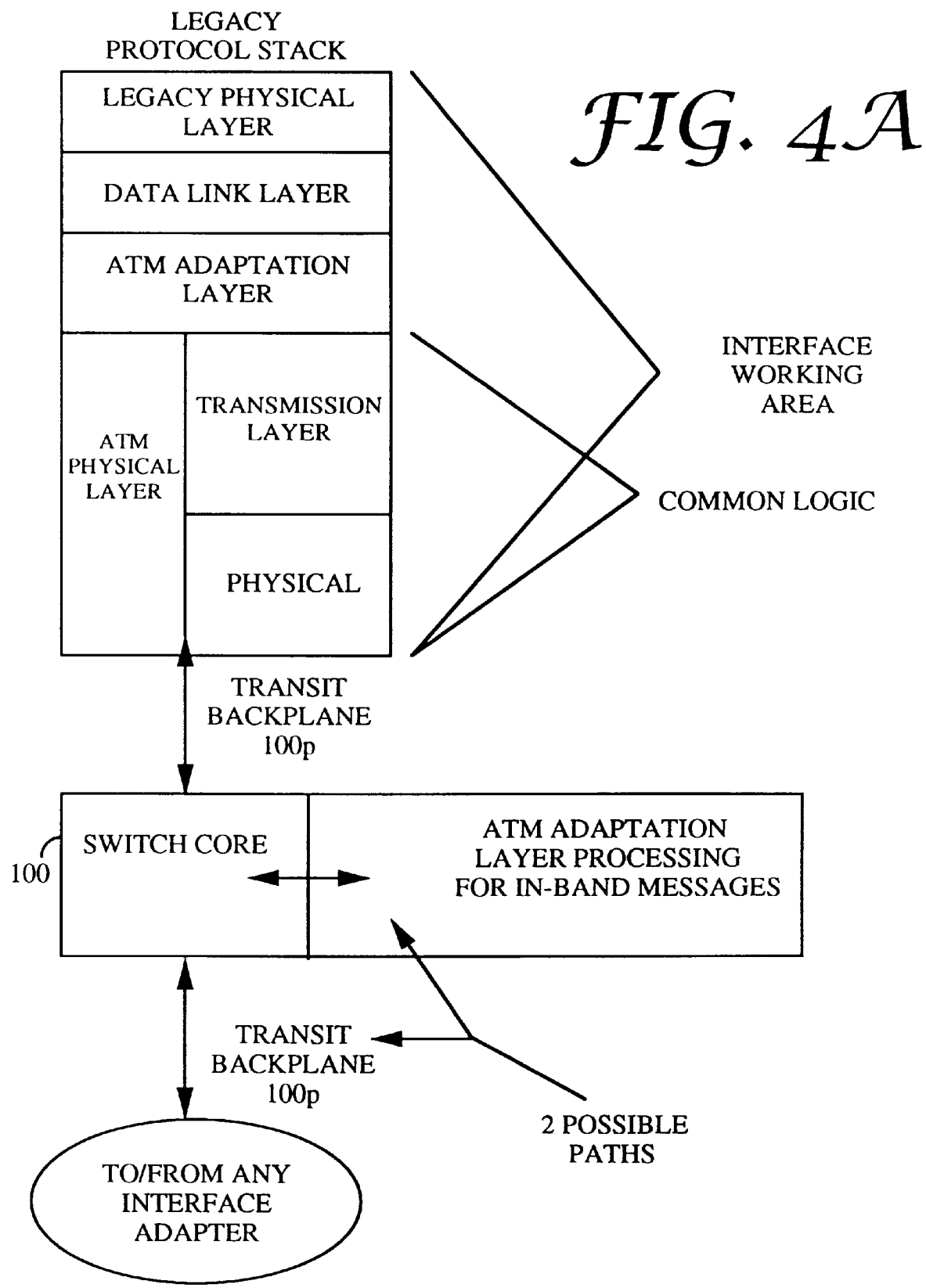

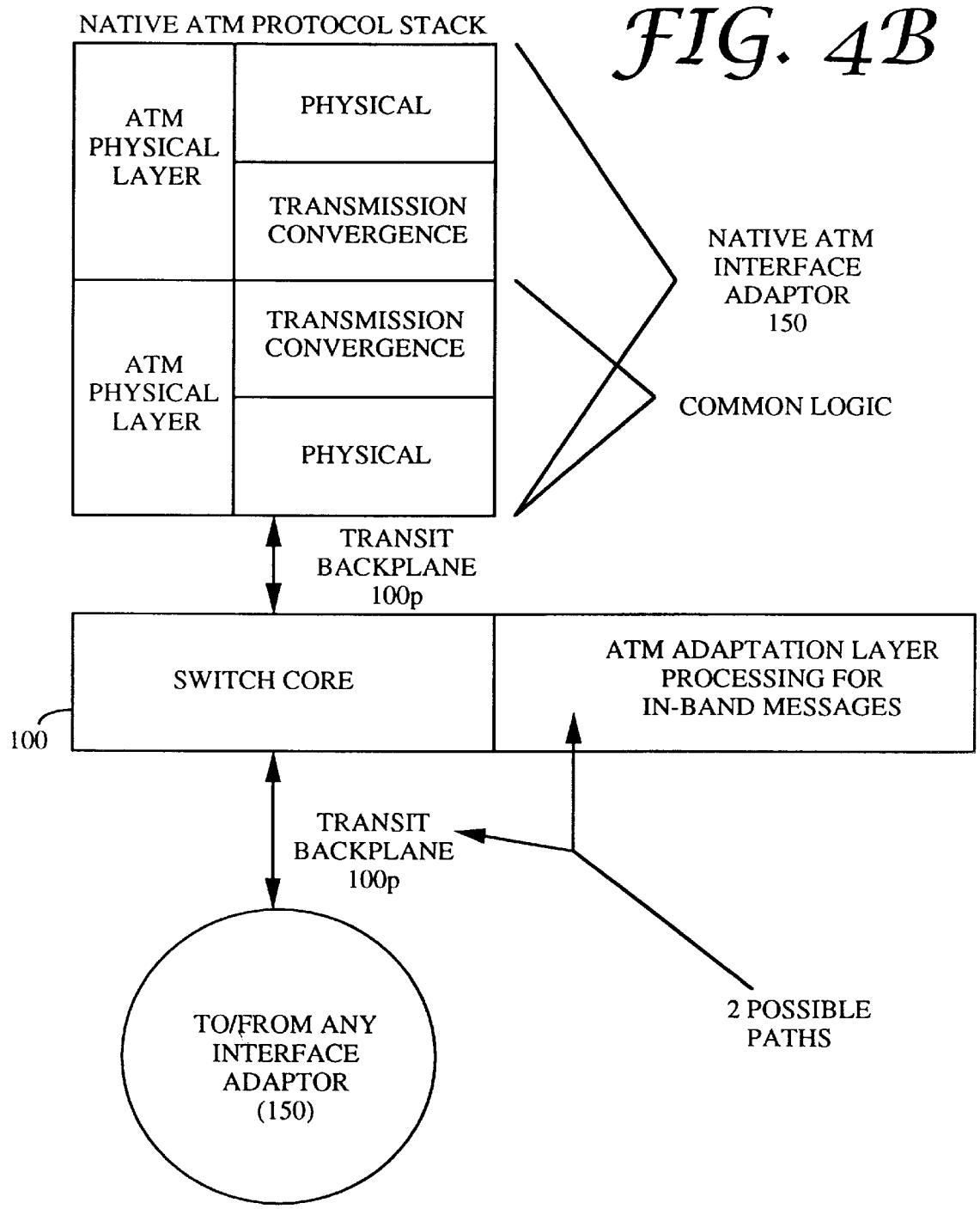

VCI PARTITION

| START VPI | STOP VPI | START VCI | STOP VCI | REPEAT COUNT |
|---|---|---|---|---|
| 0 | 0 | 0 | 2000 | 1 |
| 1 | 1 | 0 | 20 | 199 |
| 300 | 499 | 0 | 2000 | 1 |

LIVE VCI TRANSLATION
TABLE OF RECORDS

TRANSLATION RECORDS 8b
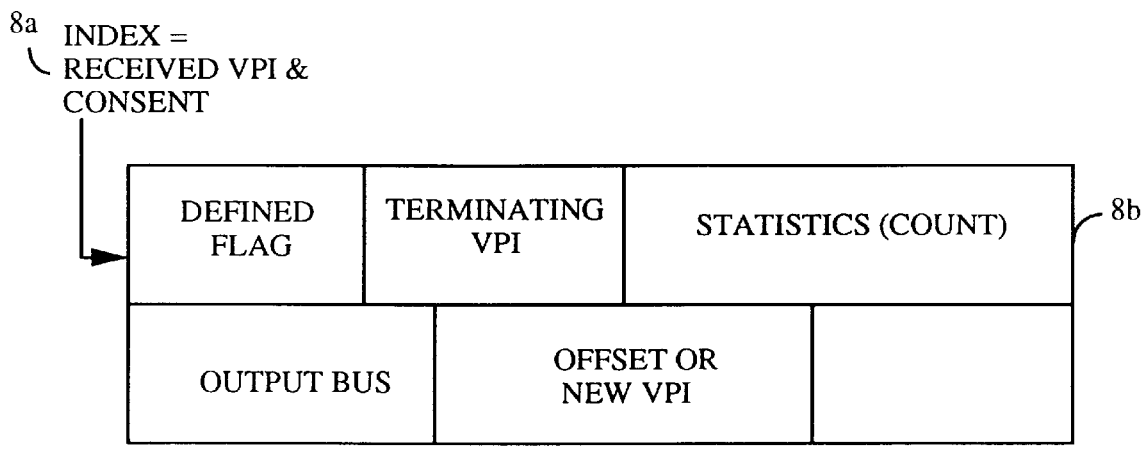
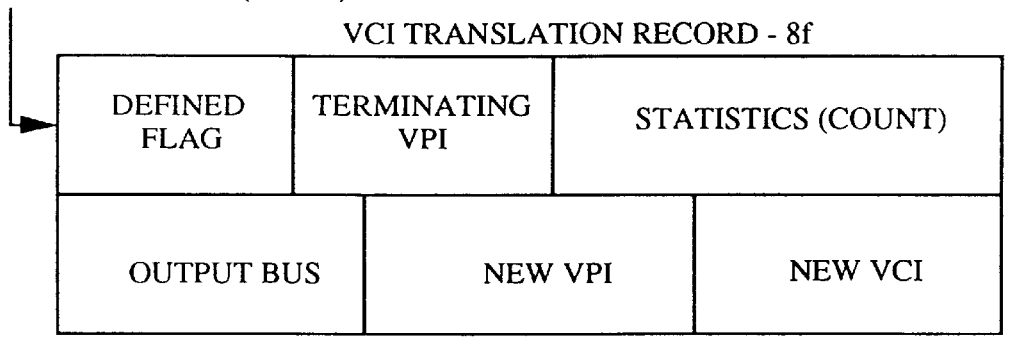
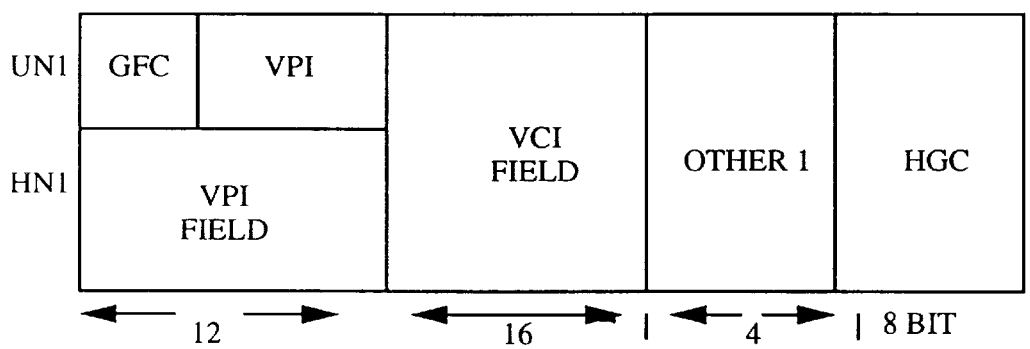
FIG. 7

Search order can be: RAM then flash
flash only

2 Level record system allows for replacement of
configuration records (a) temporarily, or (b) permanently.

Compression algorithm operates on byte data, which matches the byte aligned instruction format of the computer programs.

Each

Main Tasks:

Task 'X'

Task 'X' Code

Read my queue
Independent MG count for task 'X'
Switch on message type

Proc. type 1

Proc. type 2

.
.
.

Proc. type n

Each task status:
    Max time w/o MSG count change

JMP

Fault Monitor Task

Every 0.5 seconds loop over all tasks
Test if MSG count for task 'N' has changed
If no, send a dummy MSG
End loop if task fails 'K' tests
Restart system

FIG. 17

A. PROC. WRITES TRANS. RECORD WORD O LOWER HALF INTO REG. 1

B. PROC. WRITES TRANS. RECORD WORD O UPPER HALF INTO REG. O

C. PROC. WRITES DON'T CARE AT ADDRESS OF TRANSLATION RECORD WORD TO MOVE REG. O AND REG. 1 INTO TRANSLATION TABLE

REPEAT FOR SECOND WORD OF TRANSLATION RECORD

Flow Relating to Use of Invention in Fig. 16

HEADER TRANSLATION FUNCTION

Queue Control

Core Processor Memory Map

| | |
|---|---|
| Shared Memory | Access: RW |
| Start Address: | 0x9300000 |
| End Address: | 0x9303FFFC |
| Record Size: | 16 words |
| Number of Records: | 4096 |

| | | Shared Memory Record Description | | | | |
|---|---|---|---|---|---|---|
| Word | 31 | 24 | 23 | 16 | 15 | 8 | 7 | 0 |
| 0 | | The 1st word is the new header, and the format varies depending on whether the interface is UNI or NNI compliant | | | | |
| | UNI | GFC | VPI | VCI | PTI & CLP |
| | NNI | VPI | | |
| 1-12 | Cell Payload | | | | | |
| 13-15 | Reserved | | | | | |

Structure of Block that a Cell Occupies in Shared Memory

*FIG. 28*

Core Processor Memory Map

Processor Transmit Queue          Access:
Start Address:     0x91Dxxxx0
End Address:      0x91Dxxxx0
Record Size:       4 half words
Number of Records:   1

| Queue Record Description ||||||||
|---|---|---|---|---|---|---|---|
| Word | 31 | 24 | 23 | 16 | 15 | 8 | 7 | 0 |
| 0 | Reserved |||| Shared Memory Address of Cell (x16) || Res. ||
| 1 | The 2nd word is the new header, and the format varies depending on whether the interface is UNI or NNI compliant ||||||||
| | UNI | GFC || VPI | VCI || PTI & CLP |
| | NNI | VPI ||| VCI || PTI & CLP |

PTQ Write to Queue 1
Address:       0x918xxxxx (perform write)

PTQ Write to Queue 2
Address        0x919xxxxx (perform write)

PTQ Write to Queue 3
Address:       0x91Axxxxx (perform write)

Structure of Record in Transmit Queue

*FIG. 29*

Core Processor Memory Map

VPI Translation Table:
Start Address:            0x91C18000
End Address               0x91C1FFFE
Record Size:      4 half words
Number of Records:   4096

Table 4 - VPI Lookup Table Record Definition

| Word | Bits | Description |
|---|---|---|
| 0 | 31 | Defined Record Flag. Indicates that the VPI value has been defined as a valid VPI. For multi-cast, this is high only for the first record in the list. |
| 0 | 30 | Multi-cast Flag. Low indicates this is the last (or only) record in a list. |
| 0 | 29 | NNI/UNI Flag. Indicates that the VPI is 8 bits or 12 bits. Determines how to handle GFC field. |
| 0 | 28 | Terminate Flag. Indicates that VCI translation is required. |
| 0 | 27 | Reserved |
| 0 | 24-26 | Reserved for Quality of Service (QOS Queue ID). |
| 0 | 20-23 | Output Port Number (non-terminating only). (Binary) |
| 0 | 0-19 | VPI Cell Count. Number of cells processed for this VPI. |
| 1 | 20-31 | New VPI value (non-terminating only). |
| 1 | 4-19 | VCI lookup table offset (x8) (terminating only). |
| 1 | 0-3 | Reserved |

To manually lookup, multiply VPI by 8.

Structure of Record in VPI Translation Table

*FIG. 30*

Core Processor Memory Map

| | | | | |
|---|---|---|---|---|
| VCI Translation Table: | | | 20000 | Access: RW |
| Start Address: | | 0x91C | | |
| End Address | | 0x91C | | |
| Record Size: | 4 half words | | 3FFFE | |
| Number of Records: | 16384 | | | |

Table 5 - VCI Lookup Table Record Definition

| Word | Bits | Description |
|---|---|---|
| 0 | 31 | Defined Record Flag. Indicates that the VCI value has been defined as valid. |
| 0 | 30 | Multi-cast Flag. Low indicates this is the last (or only) record in a list. |
| 0 | 29 | NNI/UNI Flag. Indicates that the VPI is 8 bits or 12 bits. Determines how to handle GFC field. |
| 0 | 28 | Always = 1 (Required to be written) |
| 0 | 27 | Reserved |
| 0 | 24-26 | Quality of Service (QOS Queue ID). |
| 0 | 20-23 | Output Port Number |
| 0 | 0-19 | VCI Cell Count. Number of cells processed for this VPI/VCI pair. |
| 1 | 20-31 | New VPI. |
| 1 | 4-19 | New VCI. |
| 1 | 0-3 | Reserved. |

To manually lookup, multiply VPI by 8.

Structure of Record in VCI Translation Table

*FIG. 31*

Core Processor Memory Map

Queue Records

|  | Queue 0 | Queue 1 | Queue 2 | Queue 3 |
|---|---|---|---|---|
| Start Address: | 0x91C00000 | 0x91C04000 | 0x91C08000 | 0x91C0C000 |
| End Address: | 0x91C03FFE | 0x91C07FFE | 0x91C0BFFE | 0x91C0FFFE |
| Record Size: | 4 half words | | | |
| Number of Records: | 2048 | 2048 | 2048 | 2048 |

| Table 6 - Queue Record Definition Queue Record Description |||||||
|---|---|---|---|---|---|---|
| Word | 31 | 24 | 23 | 16 | 15 | 8 | 7 | 0 |
| 0 | Reserved || Shared Memory Address of Cell (x16) || Res. ||
| | The 2nd word is the new header, and the format varies depending on whether the interface is UNI or NNI compliant ||||||
| 1 UNI | GFC | VPI | VCI || PTI & CLP ||
| 1 VNI | VPI || VCI || PTI & CLP ||

FIG. 32

Core Processor Memory Map

Interface Adapter Interrupts:

Interrupt 1 Flags
Start Address:
End Address:                              0x92001000    Access: RW
Record Size:        2 half words          0x92001002    Reset:  R?
Number of Records:  1

Interrupt 1 Mask Bits
Does not exist.

| Table 7 Interrupt 1 Flags/Masks ||
|---|---|
| Bit | |
| 'n' | At address 0x92001000 Interface Adapter in Slot Number 'n' has sent interrupt. At address 0x92001002, Interface Adapter in Slot Number 'n + 16' has sent interrupt. |

Interface Adapter Interrupt Status and Mask Registers
Each Interface Adapter has three Interrupt Status Registers and
three Interrupt Mask Registers.
See 'Common Logic Controls' below.

*FIG. 33*

Core Processor Memory Map

Switch Core Interrupts

Interrupt 2 Flag Register
Start Address:     0x90800000                                               Access: RW
End Address                                                                   Reset: R
Record Size:          1 half word
Number of Records: 1

Interrupt 2 Mask Register
Start Address:     090800002
End Address:
Record Size:          1 half word
Number of Records  1

Table 8 - Interrupt 2 Flags/Masks

| Bit | Description |
|---|---|
| 0 | Detailed Status Register Contains Header |
| 1 | VPI Cell Counter Roll Over (optional) |
| 2 | VCI Cell Counter Roll Over (optional) |
| 3 | Undefined VPI |
| 4 | Undefined VCI |
| 5 | Output Queue 1 Full |
| 6 | Output Queue 2 Full |
| 7 | Output Queue 3 Full |
| 8 | Processor Receive Queue Not Empty |
| 9 | Default Output Address Used |
| 10 | Incorrect Start-Of-Cell |
| 11-15 | Reserved |

Detailed Register                                                                     Access: R
Start Address:     0x90800004
End Address:
Record Size:          2 half words
Number of Records: 1

*FIG. 34*

Core Processor Memory Map

MIB Objects  Access: R
Table of Counters:
Start Address:      0x90000000
End Address:        0x90000035
Record Size:        2 half words
Number of Records:  13

Table 9 - MIB Elements Summary

| Mnemonic | Address | Description |
|---|---|---|
|  | 0x90000000 | Missing Cells, Port 1 |
|  | 0x90000004 | Missing Cells, Port 2 |
|  | 0x90000008 | Missing Cells, Port 3 |
|  | 0x9000000C | Bad Start of Cell, Port 1 |
|  | 0x90000010 | Bad Start of Cell, Port 2 |
|  | 0x90000014 | Bad Start of Cell, Port 3 |
|  | 0x90000018 | Parity Error In Cell, Port 1 |
|  | 0x9000001C | Parity Error In Cell, Port 2 |
|  | 0x90000020 | Parity Error In Cell, Port 3 |
| RCCx |  | Received Cell Count at Port x |
| TCCx |  | Transmitted Cell Count at Port x |
| VPICCx | Part of VPI Translation Table | Translation Cell Count for VPIx |
| VCICCx | Part of VCI Translation Table | Translation Cell Count for VCIx |
| Mode |  | Switch Core Operating Mode |
| State |  | Switch Core Operating State |
|  | 090000024 | Queue 1 Full |
|  | 090000028 | Queue 2 Full |
|  | 09000002C | Queue 3 Full |

Statistics Maintenance on Switch Performance

*FIG. 35*

Core Processor Memory Map

Token Manager  Access: W
Start Address: 0x90400000
End Address 0x90400033
Record Size: 1 byte
Number of Records: 51

Table 10 - ATM Bus Control Configuration Parameters

| Parameter Name | Address |
| --- | --- |
| Bus A High Priority List Start Address | 0x90400000 |
| Bus A High Priority List Stop Address | 0x90400001 |
| Bus A High Priority List Length | 0x90400002 |
| Bus B High Priority List Start Address | 0x90400003 |
| Bus B High Priority List Stop Address | 0x90400004 |
| Bus B High Priority List Length | 0x90400005 |
| Bus C High Priority List Start Address | 0x90400006 |
| Bus C High Priority List Stop Address | 0x90400007 |
| Bus C High Priority List Length | 0x90400008 |
| Bus A Low Priority List Start Address | 0x90400009 |
| Bus A Low Priority List Stop Address | 0x9040000A |
| Bus A Low Priority List Length | 0x9040000B |
| Bus B Low Priority List Start Address | 0x9040000C |
| Bus B Low Priority List Stop Address | 0x9040000D |
| Bus B Low Priority List Length | 0x9040000E |
| Bus C Low Priority List Start Address | 0x9040000F |
| Bus C Low Priority List Stop Address | 0x90400010 |
| Bus C Low Priority List Length | 0x90400011 |

Parameters for Configuring Bus Control by Token Manager

*FIG. 36*

Core Processor Memory Map

Interface Adapter Card Info                                                     Access: RW Common Logic
In each of the following addresses, aa is the slot number (in hex) of the corresponding interface adapter.

Common Logic Configuration PROM (Read Only)

| Parameter | Address | Record Size |
|---|---|---|
| Card Type | 0x92aa0000 | 1 byte |
| Hardware Revision Number | 0x92aa0001 | 1 byte |
| Software Revision Number | 0x92aa0002 | 1 byte |
| (Reserved) | 0x92aa0003 | 1 byte |
| Assembly Serial Number | 0x92aa0004 | 4 bytes |
| Token Requirements (TBD) | 0x92aa0008 | 1 byte |
| Max Port Bandwidth, MS byte | 0x92aa000A | 1 byte |
| Number of Physical Ports | 0x92aa000B | 4 LSB's of 1 byte |
| Max Cells in Tx/Rx FIFO | 0x92aa000C | 2 bytes |

FIG. 37

Core Processor Memory Map

Common Logic Controls (Read/Write)

| Parameter | Address | Record Size |
|---|---|---|
| Interrupt Status Bits, Processor FPGA | 0x92aa1000 | 2 half words |
| Control Register, Processor FPGA | 0x92aa1004 | 1 half word |
| Status Register, Processor FPGA | 0x92aa1006 | 1 half word |
| Interrupt Mask Register, Processor FPGA | 0x92aa1008 | 1 half word |
| Interrupt Status Register, Processor FPGA | 0x92aa100A | 1 half word |
| Control Register | 0x92aa3000 | 1 half word |
| Interrupt Mask Register | 0x92aa3004 | 1 half word |
| Interrupt Status Register | 0x92aa3006 | 1 half word |
| Number of Cells in TxRx FIFO | 0x92aa3008 | 1 half word |
| Tx FIFO Depth Gauge (Read Only) | 0x92aa300C | 1 half word |
| Rx FIFO Depth Gauge (Read Only) | 0x92aa300E | 1 half word |
| T0 Flow Control Parameter | 0x92aa3010 | 1 half word |
| R0 Flow Control Parameter | 0x92aa3012 | 1 half word |
| T1 Flow Control Parameter | 0x92aa3014 | 1 half word |
| R1 Flow Control Parameter | 0x92aa3016 | 1 half word |

Transmit VPI Filter
Start Address:   0x92aa2000
End Address:    0x92aa2FFF
Record Size:    1 byte
Number of Records: 4096

Access: RW $\mathcal{FIG.}\ 38\mathcal{A}$

Table II Transmit VPI Filter

| Byte | Description |
|---|---|
| 'nnn' | At address 0x92aa2nnn, set the LSB to 0 if the VPI is to be rejected, otherwise set the LSB to 1... |

Core Serial Communication Device

Transmit data at:   Port J4    0x90C00000
                    Port J3    0x90C00008

Core Loop back
    Set PIO bits to low to enable loop back

Bus     Bit
    A       PIO12       800000D8    data register
    B       PIO11       800000DC    output enable
    C       PIO10

Enable the outputs and set them all high for no loop back

Set one (one only) low for the selected loop back path

HSEHB*      PIO14       Set low output to enable hot swap
    HS_SW       PIO13       Set as input (high enables)

FIG. 38B

Core Processor Memory Map

ATM Interface Adapter Specific Parameters

In each of the following addresses, aa is the slot number (in hex) of the corresponding interface adapter.

ATM INTERFACE ADAPTER PARAMETERS

| Parameter | Address | Record Size |
|---|---|---|
| Control Register, Common FPGA | 0x92aa8000 | 1 byte |
| Control Register, Daughter Board | 0x92aa8001 | 1 byte |
| LED Register, Daughter Board | 0x92aa8002 | 1 byte |
| Interrupt Mask Register, Daughter Board | 0x92aa8003 | 1 byte |
| Interrupt Status Register, Daughter Board | 0x92aa8004 | 1 byte |
| PM5345 SONET Chip Registers | 0x92aa8200 to 0x92aa82FF | To Be Supplied |
| Daughter Board ID Register | 0x92aa8300 | 4 LSB's of 1 byte |

FIG. 39

NETWORK ACCESS COMMUNICATIONS SYSTEM AND METHODOLOGY

This application claims priority from provisional application Ser. No. 60/007,147 filed Nov. 1, 1995.

BACKGROUND OF THE INVENTION

This invention relates to networks and more particularly, to a bridging and switching methodology, architecture, and protocol for bridging a plurality of networks and a shared core system with interface adapters, coupled via a unique multiple bus architecture and protocol, and bus management.

Existing networks include analog (e.g., voice, composite video, etc.), and video, and can be coupled any of numerous ways including electrically and optically, and can be direct physically coupled or wireless broadcast.

Numerous products exist to permit switching across and among a plurality of similar type individual networks. One class of products are bus adapters. Bus adapters permit switching between different bus architectures. For instance, given a Nubus in the Apple Macintosh architecture and an Sbus in the Sun Spark Station architecture, the two buses could be connected together to a bus adapter that converted both the data architecture from either the Nubus or the Sbus to the other and the physical signal level on each bus. Switching across networks may also be accomplished through conventional communication protocols. Ethernet, FDDI, TCP/IP, SCSI, and the RS-232-C serial interface can perform the function of connecting disparate systems. Although these protocols are often slow and complex, they're well understood, standardized, and well documented. Protocol converters permit a hardwired interface between different protocol interface architectures, such as Ethernet to serial.

Difficulties arise in attempting to integrate dissimilar types of network computers, data, voice, airwave broadcast, cable systems (having very high bandwidth capacity), telephone long lines, fiber optics, lease lines, etc.

A standard was achieved defining a framework from which individual designers could create their own individual solutions to implement and build from and onto an agreed upon basic specification for Asynchronous Transfer Mode (ATM) technology. By adhering to a predefined nucleus of selected common passing criteria, dissimilar data architecture and protocol systems are allowed to independently communicate along a common pathway.

Publication of Asynchronous Transfer Mode technology literature is plentiful, and is incorporated herein by reference, including the following:

ATM Forum, "User-to-Network Interface (UNI) Specification", Version 3.0 (UNI Spec.).

ATM Forum, "LAN Emulation (LANE) Specification", Version 1.0

Case et al., "Simple Network Management Protocol (SNMP)", 1990 May (RFC 1157).

Draft Recommendation 1.150, B-ISDN ATM Functional Characteristics, CCITT SG XVIII, Report R34, June 1990.

C. A. Sunshine, ed., *Computer Network Architectures and Protocols*, (Plenum, N.Y.).

Stassinopoulos et al., "ATM Adaptation Layer Protocols for Signalling", *Computer Networks ISDN Systems*, 23 (4) (1992), pp. 287–304.

Pirat, P., "Synchronization and Error Recovery in Video Terminal Adapters in an ATM Environment", Race 1022 Workshop, Paris, October 1989, CNET.

Fuhrmann et al., "Burst and Cell Level Models for ATM Buffers", IBM Research Report RZ 2014, August 1990.

Eckbert et al., "An Approach to Controlling Congestion in ATM Networks", *U-Dacs*, 3 (2) (1990), pp. 199–209.

Various forays into attempting to build an ATM compatible product have yielded patchwork solutions, incomplete in their compliance with the ATM specification. In modifying existing systems, many constraints are placed on the implementation alternatives a designer can use. Nonetheless, many creative designs have evolved to permit limited access into ATM for existing computer and other data network users. Systems of this type include ATM systems or ATM bridging systems developed by Fore Systems, Newbridge, and Cisco. Fore Systems and Newbridge specialize in ATM systems, while Cisco builds routers. In addition, companies such as NetEdge build devices that multiplex multiple Ethernet ports onto a wide area network. The disadvantage of the NetEdge system is that they mix multiple users' data such as a router would mix the data.

In attempting to implement a real system solution to ATM compatibility and simultaneously provide a bridge between dissimilar network structures, many problems are encountered. A key one is the need for a very high bandwidth bus architecture to support very high speed communications to and from each of the attached network Interface Adapters. Numerous problems exist in the various combinations of choices for obtaining high bandwidth communication between attached input/output Interface Adapters and/or a central switch core which coordinates and manages ATM traffic, including but not limited to cell flow prioritization, bus arbitration, etc. Various problems also exist with regard to bus management. Where multiple Adapters simultaneously contend for a given bus, management of collision allocation, frequency and duration, all present problems.

SUMMARY OF THE INVENTION

In accordance with one aspect of the present invention, a system architecture is provided where multiple mutually exclusive cell buses provide for the high bandwidth parallel communication of cell data between attached interface Adapters and the switch core. In accordance with a preferred embodiment of the present invention, the switch core is comprised of a shared core comprising a shared memory (logically structured in part as a circular list), a shared processor subsystem (which handles, for example, power-up initialization, including VPI and VCI translation record index tables, on-going monitoring, management by exception, and wellness testing), and a shared bus arbitration control subsystem (comprising the data in/data out queue control and the translation table mapping, and the bus master/slave apparatus and logic of the invention.

The shared core is coupled to the shared bus subsystem comprised of multiple individual cell buses, a shared processor control bus, and a shared arbitration control bus. Each attached I/O Adapter subsystem is coupled to the shared bus subsystem. The shared processor is coupled to the shared processor control bus, providing control signals thereupon for initialization and subsequent communication with and control of attached ones of the I/O adapters, such as to set up data structures (e.g., registers, translation tables, configuration data, etc.). The core processor also sets up data structures in the shared core, such as registers, flags, translation tables, configuration data, and indexed mappings logically stacked (push/pull), providing for establishment of priority and non-priority listings (data structures to support the listing) for each independent cell bus, further comprising bus access allocation and regulation of Interface Adapter Access thereto. The Core Processor Subsystem also sets up data structures of like kind in the shared memory.

In a similar manner, the Terminal Interface Subsystem is set up by the Core Processor Subsystem.

The Core Processor subsystem can also provide ongoing monitoring of other subsystems of the shared core and attached I/O adapters, including wellness monitoring of processes, attachment status of I/O adapters, etc.

In accordance with another aspect of the present invention, the I/O Adapter is comprised of two subsystems: a common (shared) interface subsystem and a specific physical interface subsystem. The common logic interface subsystem interfaces to the shared bus subsystem to provide for bidirectional communication between the I/O Adapter and the Shared Core. As part of initialization, or subsequent reconfiguration, the shared processor can establish a shared bus selection for an I/O Adapter. Alternatively, an external switch can be provided to allow for manually determining which one of the multiple shared buses the I/O Adapter will be attached to for communication purposes. This attachment is a logical attachment. The I/O Adapter can couple to one or all independent cell buses, but be logically deactivated except as to the selected one. Upon detection by the shared core of a problem, bus arbitration and management circuitry in the shared bus can override and provide communication via a separate one of the individual cell buses. Thus, another novel and beneficial feature of the present invention is to provide for fault tolerant and redundant capabilities.

Another novel aspect of the present invention conforms to the full address mapping space specification of the ATM.UNI specification, without expending of huge amounts of wasted memory, provided by direct adds space mapping.

Another novel fete of the present invention is provided in the combination of the apparatus and methodology of stripping the header off the cell data associating it with the shared memory pointer, translating, queuing, and reoutputting cell data from a common shared memory storage subsystem representing data from a plurality of non-associated networks, which can be totally dissimilar, but are homogenized by the use of the shared core for complete I/O type flexibility.

The management of the multiple cell buses provides another beneficial feature of the present invention. In the illustrated embodiment, each cell bus is comprised of a uni-directional transmit bus and a uni-directional receive bus. Alternative embodiments can provide for a single cell bus to be used bidirectionally in a the shared manner. Communication on each cell bus is controlled and managed by a token management subsystem comprising master and slave bus arbitration subsystems. In a preferred embodiment, the master is within the switch core, and the slaves are within the interface adapters.

In a fully populated bridge system, there can be multiple I/O Adapters contending for access to the same cell bus at the same time. In accordance with one embodiment, the system provides for prioritization of predefined individual I/O Adapters to receive priority access to the associated selected cell bus for that I/O Adapter. There may be multiple priority I/O Adapters and multiple non-priority I/O Adapters coupled to the cell buses, all associated with the same selected cell bus, all vying for access at the same time. In this case, priority and fairness must be provided In accordance with one aspect of the present invention, the token management subsystem provides for the establishment and management of a priority token list and a non-priority token list for each of the individual cell buses. Each of these token lists is comprised of a storage area of a bus arbitration memory in the shared core, where, for example, in the illustrated embodiment, each of the three cell buses has two lists. The system and methodology for fairly managing the multiple priority and non-priority token lists for each of the cell buses is another beneficial feature provided by the present invention.

Another area of benefit is the data flow management on the I/O Adapter, in the common interface subsystem; and in the shared core, the data flow management (cell management) and queue control on the shared core system which provide for fair allocation on the cell buses for the I/O Adapters, and certain techniques used therein.

It is thus an object of the present invention to provide:

VPI/VCI Address Space Mapping

Cell Routing

Header Translation

Header/Cell Processing

Queuing

Homogenizing Bridge/Blends

Cell Bus Management

Token Management

Parallel Independent High/Low Priority Token Lists set-up and management

Data Flow (cell) Management

Queue control

Dual/Leaky Bucket Flow control of shard memory output onto cell bus.

A Shard Switch Care Architecture

A Multiple Cell Bus Architecture

These and other aspects and attributes of the present invention will be discussed with reference to the following drawings and accompanying specification.

BRIEF DESCRIPTION OF THE DRAWINGS

FIG. 1 is a block diagram showing the switch core and interface adapters of the invention, the arbitration control buses, and the processor bus.

FIG. 4A shows a block diagram depicting a method and structure converting disparate data types into ATM cell data, and converting ATM cell data back to various data types.

FIG. 4B shows a block diagram depicting a method and structure for processing native ATM cell data, without converting to or from another data type.

FIG. 7 shows the structure of the VPI translation record and the ATM header, and an index relating to the VCI translation table and the VPI table of records.

FIG. 17 shows a process for writing a translation record to either a virtual channel translation table or the virtual path translation table.

FIG. 28 shows a shared memory record format for storing ATM data cells.

FIG. 29 shows a processor transmit queue record format according to the present invention.

FIG. 30 shows a map of bits in the VPI lookup table to the bits in the VPI lookup table of records.

FIG. 31 shows a bit map of definition of the VCI lookup table to the bits in the virtual channel lookup table records.

FIG. 32 shows, a 16-bit per word queue record definition.

FIG. 33 is a block diagram showing the relationship between an adaptor slot location and an interrupt bit in accordance with the present invention.

FIG. 34 shows a bit map between interrupt 2 flags/masks register bits and their description.

FIG. 35 shows a memory map between the management information block and shared core.

FIG. 36 shows a memory map for the ATM bus control configuration parameters to the shared core.

FIG. 37 shows a memory map of parameters to addresses in a common logic configuration PROM.

FIGS. 38A and 38B show a bit map of common logic control records to shared core addresses.

FIG. 39 shows a map of the ATM interface adapter parameters.

DETAILED DESCRIPTION OF THE PREFERRED EMBODIMENT

Figure 2:
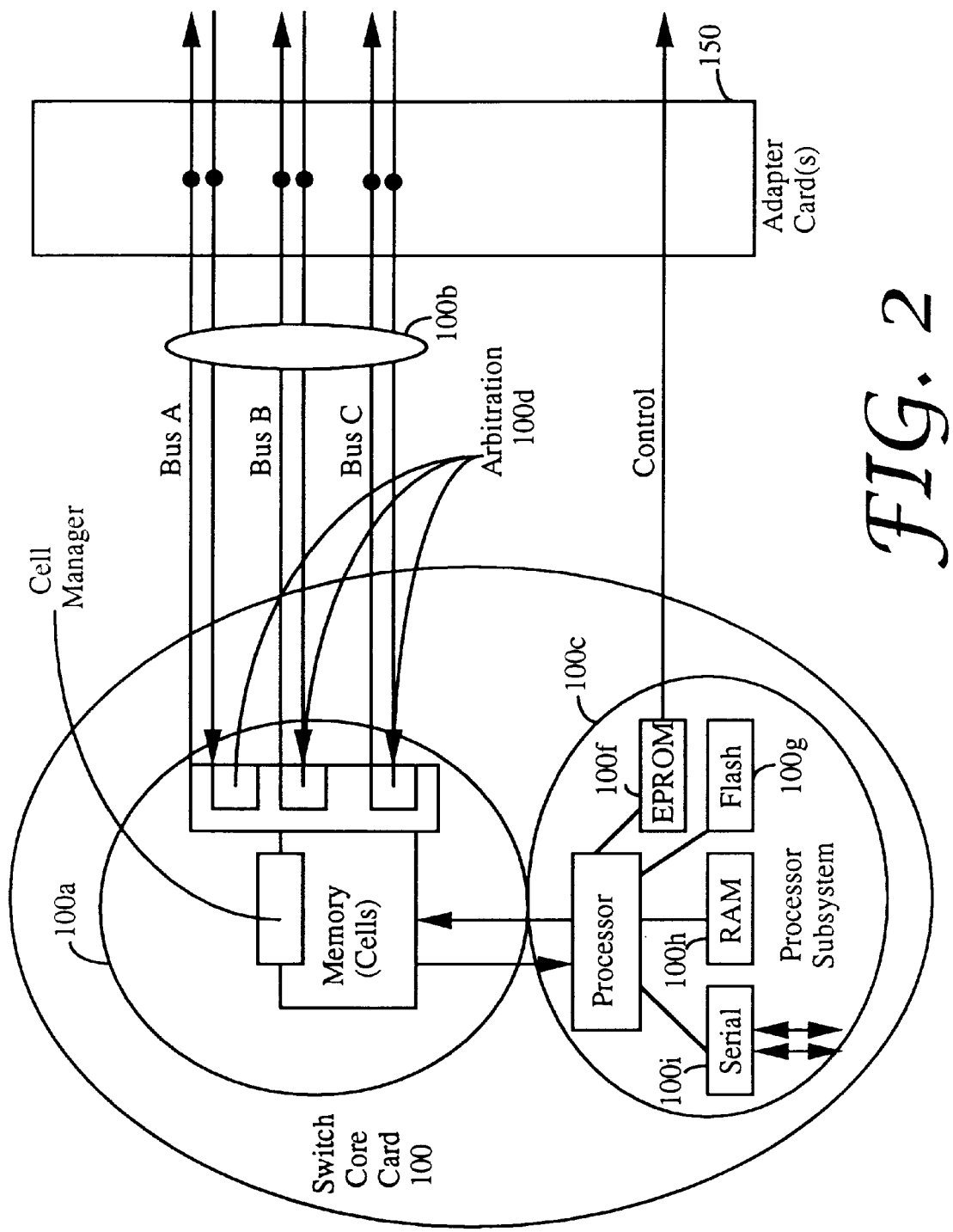
FIG. 2 is an exploded block diagram of the cell buses, interface adapter cards, processor memory, and switch core of the invention.

While this invention is susceptible of embodiment in many different forms, there is shown in the drawings, and will be described herein in detail, specific embodiments thereof with the understanding that the present disclosure is to be considered as an exemplification of the principles of the inventions and is not intended to limit the inventions to the specific embodiments illustrated.

Figure 1:
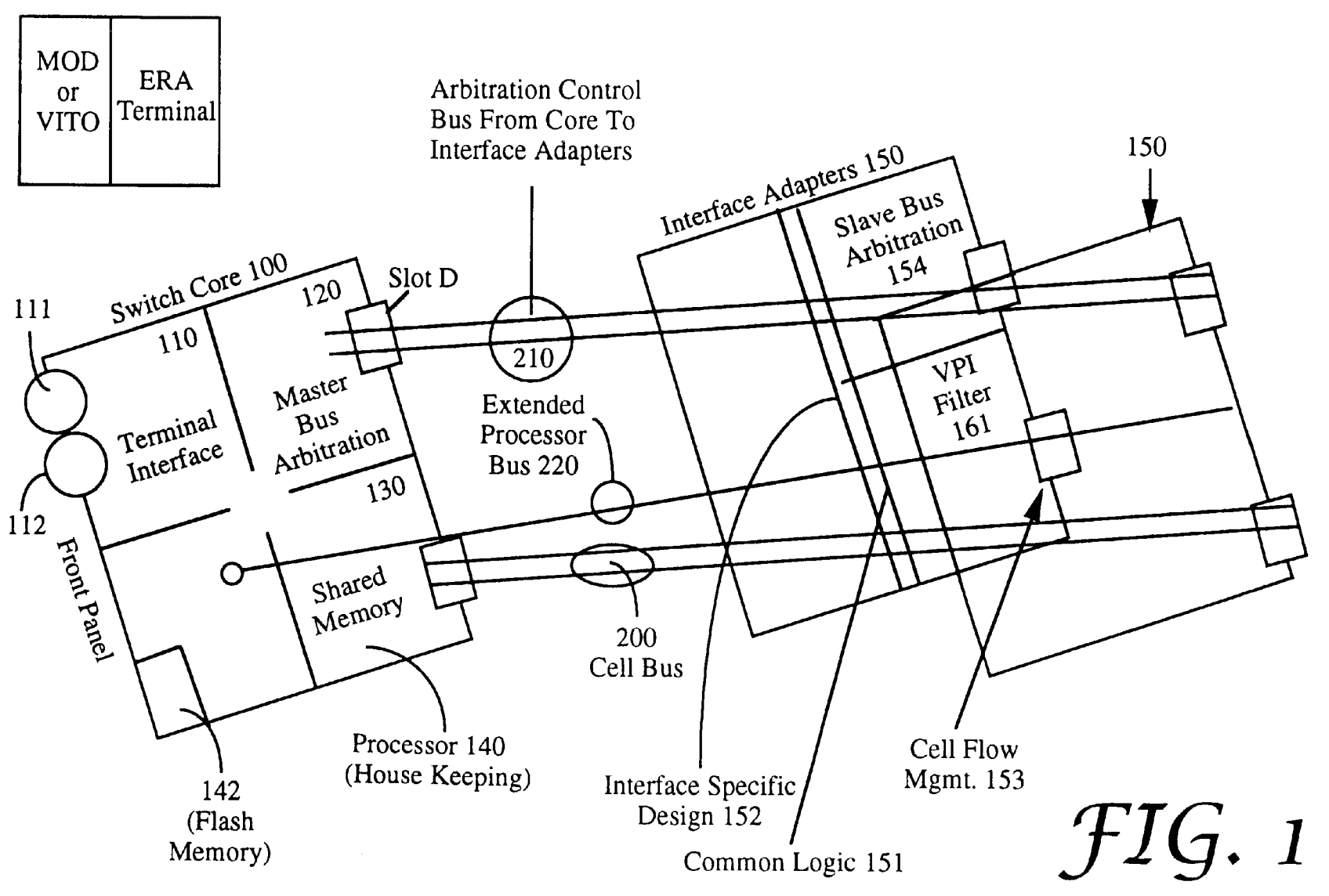

As illustrated in FIG. 1, the operator input consists of a terminal interface 110. The data connection is at connector 111 which couples to a terminal (not shown) external to the system (such as a VT100-type terminal). The terminal interface 110 provides interface hardware, including a UART, and level shifting devices, that make it compatible with the conventional VT 100 terminal protocol and physical interface. Signals from the VT 100 terminal pass through the terminal interface 110 and are coupled to and interpreted by the housekeeping processor 140 on the switch core. A menu-type program interactively controls the processor 140 in response to the operator input. The operator is presented with configuration menus, which are generally for status purposes only. The operator can review the information, but cannot change it. However, the operator can switch to menus where he can actually modify the configuration of the system. There are two types of menus: status and configuration. Software provides the menus and interprets the operator input at those menus. This type of software is conventional. However, the software in conjunction with the hardware links the user input through the terminal and the hardware on the switch core 100.

Interface adapters 150 are configured in order to establish connection and to clear connections. Various actions take place during connection establishment: (1) the translation table, which is part of the shared memory, element 130; (2) bus arbitration logic, including the assignment of the interface adapter 150 that is associated with the connection to a particular bus, and a priority, this is done on the switch core 100 in element 120; and (3) the interface adapters 150 that are part of the connection.

The typical connection has two ends. One end can be a source and the other can be a destination, although most connections are bidirectional. The actual connections are configured in terms of source and destination.

At the source interface adapter, it's necessary to identify a physical port. If there's more than one physical port on that interface adapter, it is necessary to identify the physical port that's associated with that connection. That physical port is part of the interface specific design element 152 on the interface adapter 150. If the slave bus arbitration subsystem 154 is not already enabled for other connections on that interface adapter, then they would be enabled when this connection is established. Cell flow control subsystem 153 modifies cell flow to account for additional bandwidth that may be associated with the new connection being established. Where there are other connections already established as sources from this interface adapter, cell flow would be modified. If there are no 25 previously established connections from this interface adapter, then the cell flow management 153 is initialized to be enabled and to have the cell flow parameters set up to conform to the cell bus 200 assignment (e.g., A, B, or C), and priority level assignment to be used by the connection that is being established at this time.

With regard to the interface adapter that is the destination for this connection, some similar activities take place. There's a Virtual Path Identifier (VPI) filter 161 (on FIG. 1). The VPI filter is used on the interface card to recognize the cells with the VPI corresponding to the connection that's being established. The purpose of that filter is to limit interface of cells so that the interface adapter 150 and all of the logic on that board does not have to accept cells that are not intended to be received by that interface adapter.

Establishing a connection involves these processes: The first process may be the adaptation of a protocol on the source interface adapter 150. That protocol may be Ethernet, T1, or it may be some other (in which case, if they are not already in the ATM format, or ATM protocol, they would be adapted using a protocol as established in "Request For Comment #1483"). The RFC 1483 is published by the IETF (an Internet Task Force available through the Internet). Once the data has been adapted to ATM, it is given a header value associated with the port or the connection on the source side. This header value would be uniquely identified with a particular source or connection, so that the cells that are being created by this particular source would be distinguishable from cells that are created by any other connection, from any other source within the system.

Cells are created through a process of adaptation layer processing, called ATM adaptation layer. It's a part of the process of segmentation and reassembly functions to take the data packets that may exist on the physical port side of the interface specific design on the interface adapter 150, and chop them up into new cells (not shown) 48 bytes long plus a header. These new cells with the new VPI and new Virtual Channel Identifier (VCI) in the assigned data header are forwarded across the back plane (not shown) to the switch core 100 in accordance with the bus arbitration control (as described in detail hereinbelow). The switch core 100, upon receiving the cells from the physical interface associated with the connection, does header translation. That process is also described in detail elsewhere herein. The header translation function receives the cells coming from the source interface adapter, modifies the header including the VPI, or both the VPI and VCI, and enables that cell to be coupled across one of the cell buses 200 to another interface adapter 150. Thus, the cells from the original data that came from a physical interface on the source interface adapter have been processed through the switch core 100 and then forwarded to another interface adapter, and therefrom ultimately to a destination.

The receiving or destination interface adapter 150 recognizes the cells based upon analysis of the VPI field in their header, and selectively passes selected ones through the common logic, and into the destination interface adapter's interface specific design subsystem 152. Therein, the reverse process of segmentation is performed, called reassembly. The reverse of the adaptation processing (AAL) is done, to recreate the data packets in the format compatible with the physical interface to which the cells are to be sent. The cells then go out onto the physical interface that they are intended for. The process just described illustrates a case where a network interface of a non-ATM protocol forwards data through an interface adapter 150 to the switch core 100, back to another interface adapter and converts it back into the original or other protocol for output to a destination.

An alternative embodiment uses the same interface adapter 150 as a source to forward data through the switch core 100 where the same header translation takes place, and then to an ATM trunk interface adapter card (not shown). An ATM trunk card is a particular type of interface adapter where there is no adaptation layer processing, or reassembly done, rather the ATM cells that are received at that destination interface adapter will be converted to an ATM physical interface to be transported, typically over a fiber or a coax cable (not shown) to another similar interface adapter in another system. In that other system, the reverse process may take place, ultimately being converted back into the original protocol, as it was in the source.

It is to be understood that the output from the switch core 100 can also be connected to an ATM interface adapter, so that the coupling of cells would not include conversion from the ATM cell format to a different format, but rather would be transmission of cells from the stored cell format to a transmit ATM format, including header information.

As illustrated in, FIG. 1, the interface adapters 150 are each comprised of two portions. Each interface adapter 150 has a common logic portion 151 and an interface specific portion 152. Each interface adapter card couples to the switch core 100 through a series of three independent bus structures. As discussed elsewhere, the buses include the cell bus structure which includes the three cell buses, each having a transmit and receive and handshake, the extended processor bus 220 and the arbitration and control bus 210. The common logic 151 provides logic which is common to every interface adapter 150. This provides a functionally identical interface between each and every interface adapter card and the switch core 100. The common logic is comprised of multiple subparts including a bus arbitration subsystem, an extended processor bus interface subsystem, a cell flow management subsystem, and a VPI filtering subsystem, as will be described in greater detail with reference to FIG. 22.

On the interface specific logic side, 152, of the interface adapter 150, subsystems are provided for specific interface protocol requirements, such as Ethernet, T1, Optical (OC3, DS3, Frame Relay and others). The interface specific subsystems provide bi-directional translation between the specific external protocol (e.g., Ethernet) and the internal cell structure protocol for the switch core (e.g., ATM Cell). It is to be understood, that the switch core and shared memory concepts can be utilized with other network switching protocols. However, the illustrated embodiments, and descriptions thereof, are directed to an ATM architecture and protocol.

As illustrated generically in FIG. 1, there are two directions of communication between the switch core 100 and interface adapter cards 150. The interface adapter can initiate communication, translating the received data from the interface specific format to the cell format, and providing that data for storage in the shared memory of the switch core. The communication from the interface adapter to the switch core is accomplished via the receive bus of the respective assigned one of the three cell buses 200. At initialization, or later under processor control, each interface adapter is assigned to one cell bus for use in communications between that interface adapter and the switch core. Communications from the interface adapter to the switch core is accomplished on the receive bus of that one of the cell buses. In addition, the master bus arbitration logic 120 on the switch core, in conjunction with the slave bus arbitration logic 154 on each interface adapter 150, determine when the received data can be coupled via the appropriate cell bus 200, determined responsive to communications on the arbitration and control bus 210 coupling communications between the respective switch core bus arbitration subsystem 120 and interface adapter bus arbitration logic 154.

For communication from the shared memory 130 back to the respective interface adapter, the respective assigned cell bus 200, carries the cell data to be communicated on the transmit part of that respective cell bus. The arbitration and control bus 210 is not utilized for transmitting data from the switch core back to the interface adapter 150. The extended processor bus 220 is used for both directions between the switch core and interface adapter 150, such as to initially set-up appropriate registers and values. In the transmit mode from the switch core to the interface adapter, the interface adapter 150 contains specific subsystem circuitry to decode and filter the VPI portion of the cell to determine whether that cell is to be received and directed by a specific interface adapter card. Further details of this VPI filtering on the interface adapter card are provided hereinafter.

FIG. 2 is an illustration of a digital switching system in accordance with the present invention for coupling to external physical interface signal sources, such as T1, Ethernet, OC3, or DS3. The digital switching system comprises switch core assemblies and one or more interface adapter assemblies. The illustration shows the interface adapter subsystem (assembly) as adapter printed circuit cards. The switch core assembly 100 includes a shared memory subsystem 100a, a shared bus subsystem 100b, and a shared processor subsystem 100c for both sending and receiving ATM cells (not shown) utilizing the shared bus subsystem. Each interface adapter assembly is comprised of a common interface logic subsystem (not shown), for selective coupling of the interface adapter assembly 150 to the switch core assembly 100 utilizing the shared bus 100b. In addition, each interface adapter assembly 150 is further comprised of a physical interface specific subsystem 152 (see FIG. 1), which provides a means for translating specific physical interface signals that are received from the adapter subsystems into ATM cells. As illustrated, ATM cells transmitted from the interface adapter assembly over bus A, B, or C are stored in the shared memory subsystem 100a.

In addition, cells stored in the shared memory subsystem 100a can be transmitted over buses A, B, or C out to the interface adapter subsystems. ATM cells originating at the adapter subsystem can be selectively transmitted over any of the buses A, B, or C to one or more interface adapters. Additionally, shared memory ATM cells generated in the shared memory subsystem can be selectively transmitted to the adapter cards over buses A, B, or C. The shared memory control subsystem 100a includes a master bus arbitration control subsystem 120 to control access to the ATM cell buses, as discussed elsewhere herein.

The shared processor subsystem 100c includes an EEPROM subsystem 100f, flash memory subsystem 10g, a RAM subsystem 100h, and a serial interface subsystem 100j. Adapter card subsystems may be connected to the shared memory control subsystem 100a through multiple addressable slot locations in the shared bus subsystem 100b. Each slot location has a unique address range and thus, each adapter subsystem will have a unique address range. The shared memory control subsystem 100a, coupled with the shared processor control subsystem 100c, provide a means for polling the interface adapter assemblies 150 through the shared bus control subsystem 100b in order to detect the type and location of each interface adapter subassembly. The shared processor control subsystem, in conjunction with the memory control subsystem, further provides the ability to initialize logic on the interface adapter subsystem cards. Periodic polling and monitoring provides adaptive configurability, hot swapping, and fault-tolerance.

Figure 3:
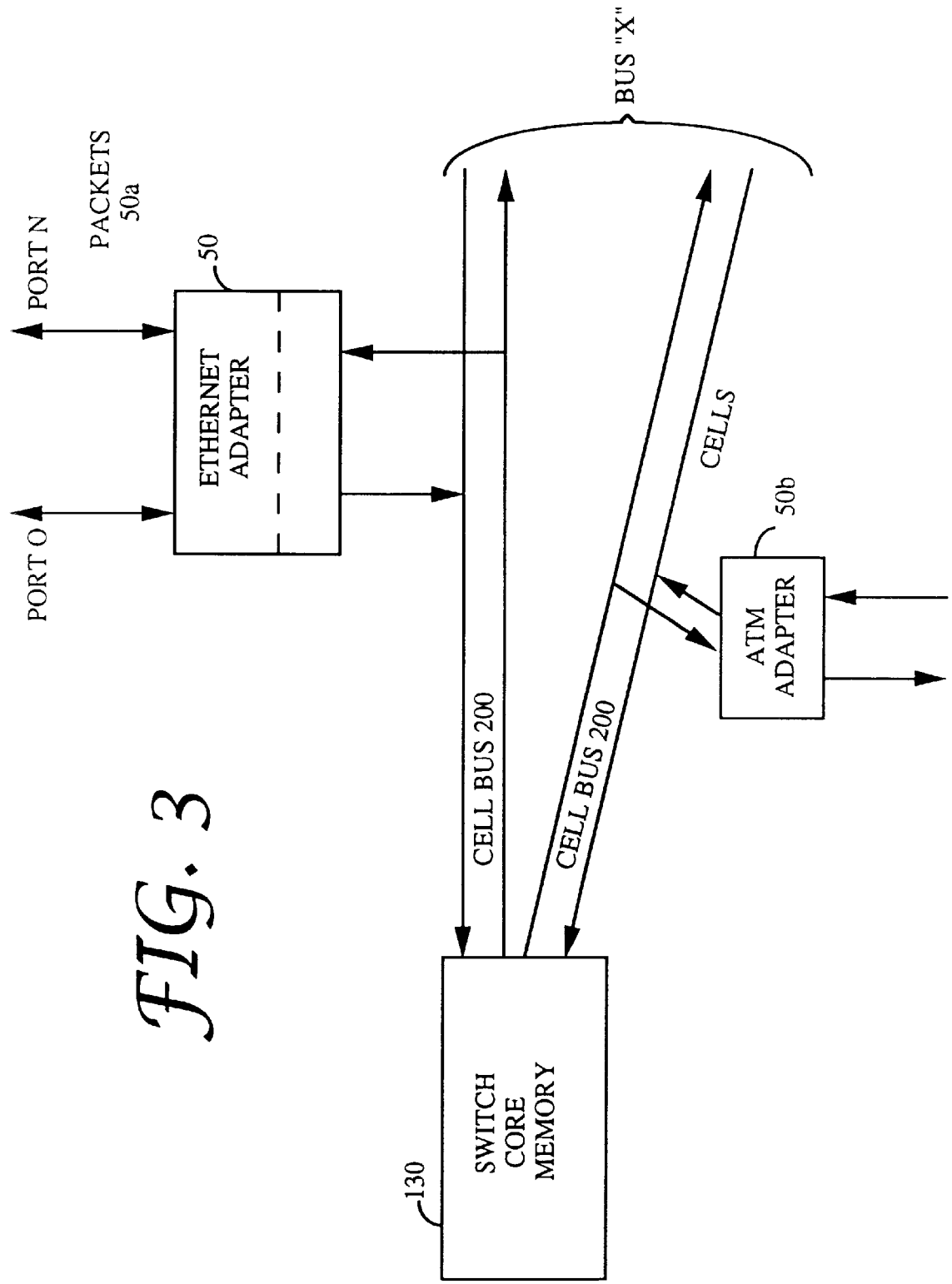
FIG. 3 is a block diagram showing a method and system for bridging dissimilar data networks.

FIG. 3 illustrates a method and system for bridging dissimilar networks in accordance with the present invention. Bi-directional ports O through N are coupled to an Ethernet adapter card 50. Ethernet packets 50a flow out of or into the Ethernet adapter card 50 through the bi-directional ports O-N. The Ethernet adapter card 50 converts Ethernet data to ATM cell data, which may be placed on bus X (e.g., A, B, or C (FIG. 2)) coupled to the Ethernet adapter card 50 and then placed in switch core memory 100, known as shared core. The ATM cells consist of a header portion and a payload portion stored in the switch core memory 100, the payload portion remaining unchanged, the header portion being partially overwritten. ATM cell data residing in the switch core memory 100 is retrieved from the switch core memory and sent out over bus X to its respective Ethernet interface adapter card. These ATM cells are processed by the Ethernet adapter card and converted into Ethernet data and sent out through ports O through N.

The switch core 100 can poll interface cards residing on bus X. The polling of interface cards permits die detection of signals that indicate the presence of ATM cells to be transmitted to the switch core subsystem. The switch core subsystem can also poll adapter cards, such as the ATM adapter card 50b. The switch core subsystem can also detect a signal indicating that the bus is not available for transmitting or receiving ATM cells, responding thereto by delaying until a bus is available for its use in desired communications.

FIG. 4 illustrates a process, method, and structure for converting other data types such as legacy data, data such as Ethernet data, T1 data, OC3 data, or DS1 data into ATM cell data, and the converse process of converting ATM cell data back to various legacy data types. Legacy physical data is received by adapter cards 150 and converted into ATM cells. This segmentation takes place in the AAL layer. The AAL layer, the ATM adaptation layer, converts data having an arbitrary legacy protocol into ATM cell data. ATM cell data is then placed on the back plane 100p, the buses 200 (see FIG. 1) in the system, and stored in shared core memory 100. On retrieval of the ATM cell data, the cells stored in shared core memory 100 are retrieved and placed on the cell bus 200, part of the back plane 100p. ATM cell data may then be received by adapter cards 150 and converted into legacy data, but before being converted to legacy data, the cells must be reassembled. Reassembled cells are then converted to legacy data types and transported to the adapter card ports and placed on the port interface. The core processor 140 is capable of monitoring all ATM conversion processing and transporting all ATM cell data to and from core processor memory.

Figure 5:
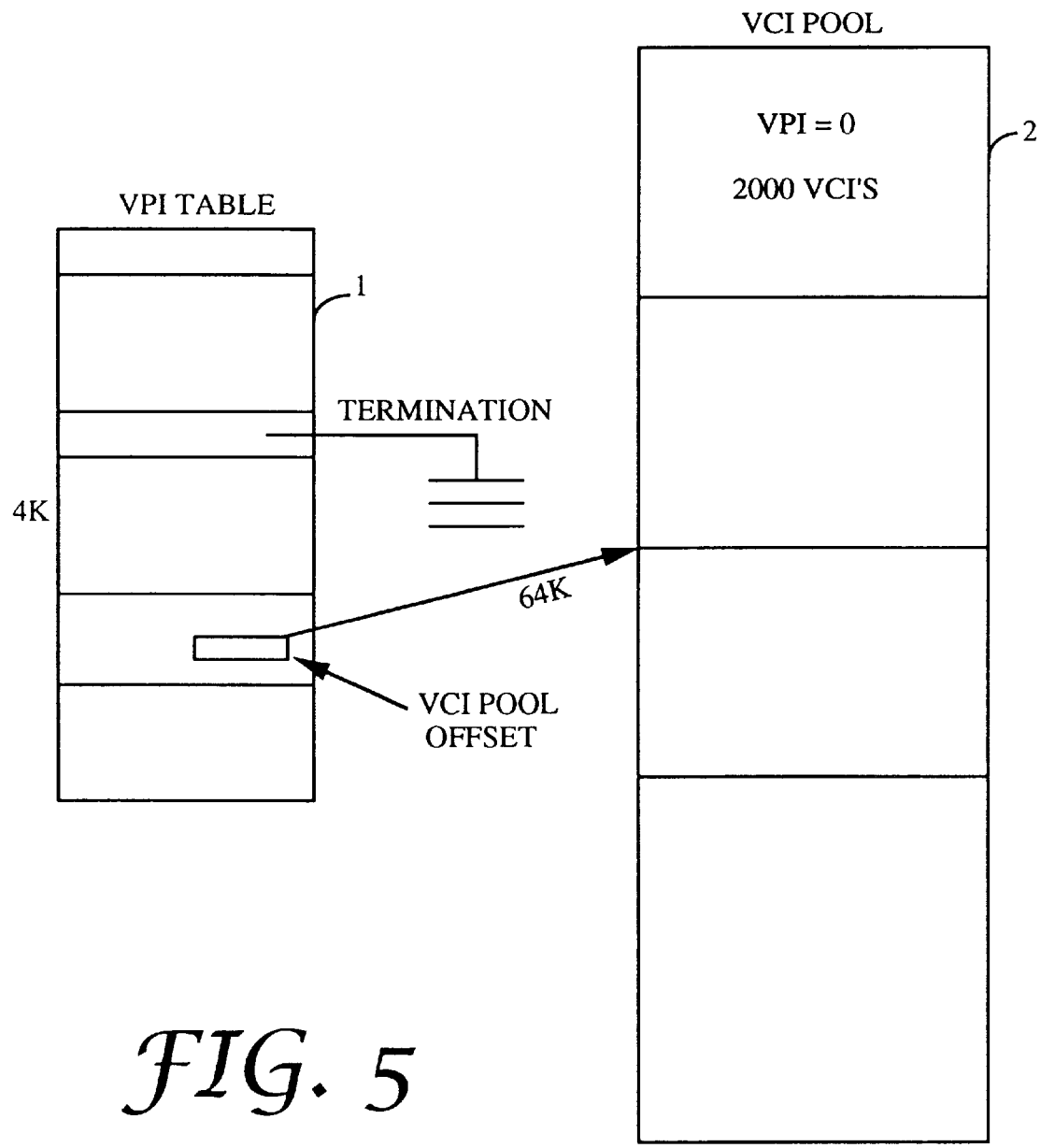
FIG. 5 is a block diagram of a VPI table and a VCI pool in accordance with the present invention.

FIG. 5 shows a virtual path identifier table 1 (a VPI table), and a virtual channel identifier pool 2 (a VCI pool). The VPI table 1 contains 4K records, while the VCI pool 2 contains 64K records. Each of the VPI table records contains information relating to a virtual path within the system of the invention. Each record in the VPI table 1 contains information designating whether the path is terminating or non-terminating, and each VPI record contains information in the form of a pointer that indicates which records in the VCI pool 2 are related to the virtual path record. Architecturally, each VPI record may be mapped into 64K VCI records. FIG. 5 illustrates one aspect of the invention where a subset of the architectural 64K records in the potential 64K VCI pool 2, which is mapped back into the 4K VPI table 1. At system initialization time, VCI offsets are entered into the VPI table 1, and VCI records are entered into the VCI pool 2. Also illustrated in FIG. 5 is that the terminating VPI has no VCI offset value.

Figure 6:
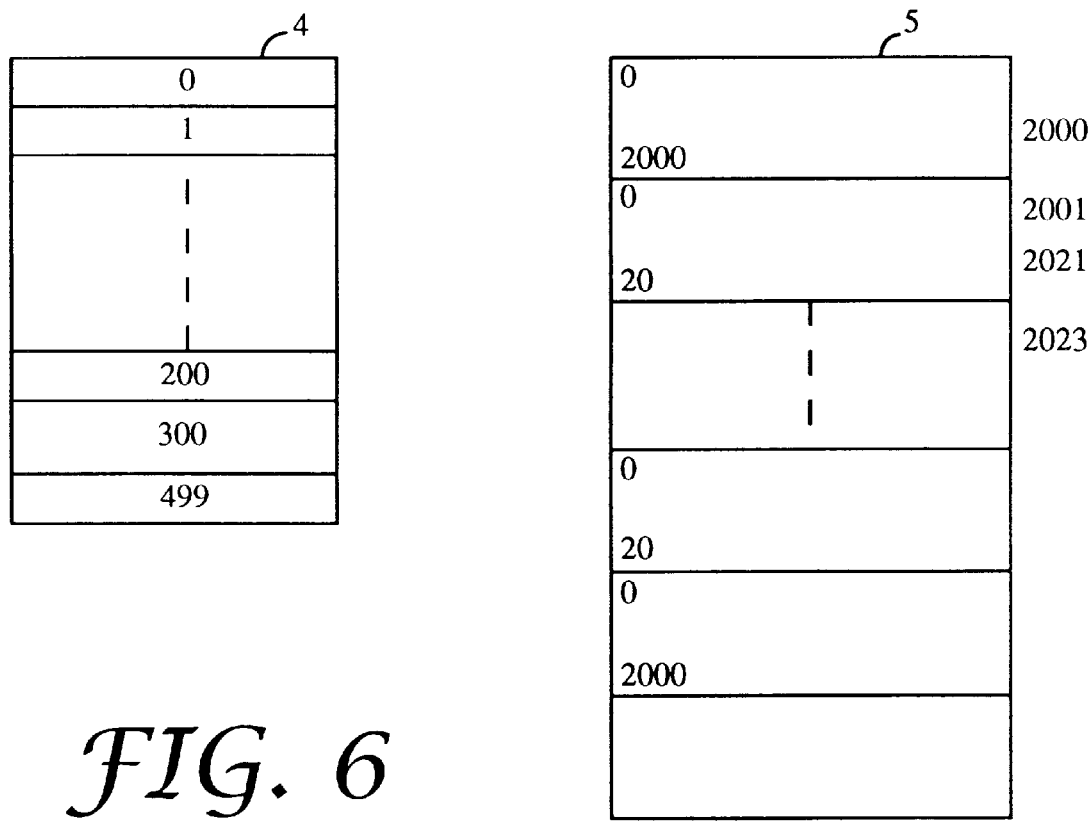
FIG. 6 shows a VCI partition table, a VPI table of records, and a VPI translation table of records.

FIG. 6 shows a virtual channel identifier partition table (VCI partition table) 3, a virtual path identifier table of records (VPI table of records) 4, and a virtual channel identifier translation table of records (VCI translation table of records) 5. Line 1 of the VCI partition table 3 contains the following entries: zero under the start VPI heading, zero under the stop VPI heading, zero under the start VCI heading, 2000 under the stop VCI heading, and 1 under the repeat count heading. This entry signifies that one VPI record, record 0, is to be mapped into a range of VCI records, that range being zero-2000. Line 2 of the VCI partition table 3 contains the following entries: 1 under the start VPI heading, 1 under the stop VPI heading, zero under the start VCI heading, 20 under the stop VCI heading, and 199 under the repeat count heading. This entry signifies that each of 200 VPI entries are to be mapped to a range of VCI entries, that range being zero to 20. Line 3 of the VCI partition table 3 contains the following entries: 300 under the start VPI heading, 499 under the stop VPI heading, zero under the start VCI heading, 2000 under the stop VCI heading, and 1 under the repeat count heading. This entry signifies that a range of VPI records, that range being 300–499, is to be mapped into a range of VCI records, that range being zero to 2000. The VPI records from the VCI partition table 3 are entered sequentially into the VPI table of records 4. In addition, the VCI records identified in the VCI partition table are entered sequentially into the VCI translation table of records 5. Finally, the VCI records, identified in the VCI partition table are mapped into the physical records of the VCI translation table of records, starting at record zero.

FIG. 7 shows the structure of the VPI translation record (the VCI translation record) 8b and the ATM header 8c, an algorithm 8d for calculating the index into the VPI translation table from the received VPI, and an index 8e into the VCI translation table from the received VCI records and VPI. The VPI translation record contains the following fields: a defined flag field, which is a field under software control, a terminating VPI field, which is a field that indicates whether this record is terminating or non-terminating, a statistics field, which accumulates various statistics on the ATM record, an output bus field, which indicates the bus which the translated ATM call is to be placed upon, and an offset or new VPI field, which indicates either the new VPI for the new ATM record, or an offset for indexing into the VPI table, for calculating the new VPI for the new ATM record.

The VCI translation record 8f contains the following fields: a defined flag field which is under software control, a statistics field, which is for accumulating various statistics on the ATM record, and an output bus field, which designates the output bus which the new ATM record is to be placed upon, a new VPI, which is the VPI to be placed in the new ATM record, and the new VCI, which is the new VCI that is to be placed in the new ATM record.

The header record 8c of the node network interface (NNI) contains the following fields: a virtual path identifier field for holding the VPI, a virtual channel identifier field for containing the VCI, a field for future use, and a header error control field for containing the HEC. The VPI field is 12 bits, the VCI field is 16 bits, the field for future use is 4 bits, and the HEC is 8 bits. The header record at the user network interface is the same as the header record at the node network interface except that the VPI field at the node network interface is subdivided into a GFC field and a VPI field at the user network interface, the GFC field being the generic flow control field. The algorithm 8d for calculating an index into the VPI translation record table is the following: the received VPI is added to a constant and the result is the index. The algorithm for calculating the index into the VCI translation record table is the following: the offset calculated from the received VPI is added to the VCI which is added to a constant. The result is the index into the VCI translation record table.

Figure 8:
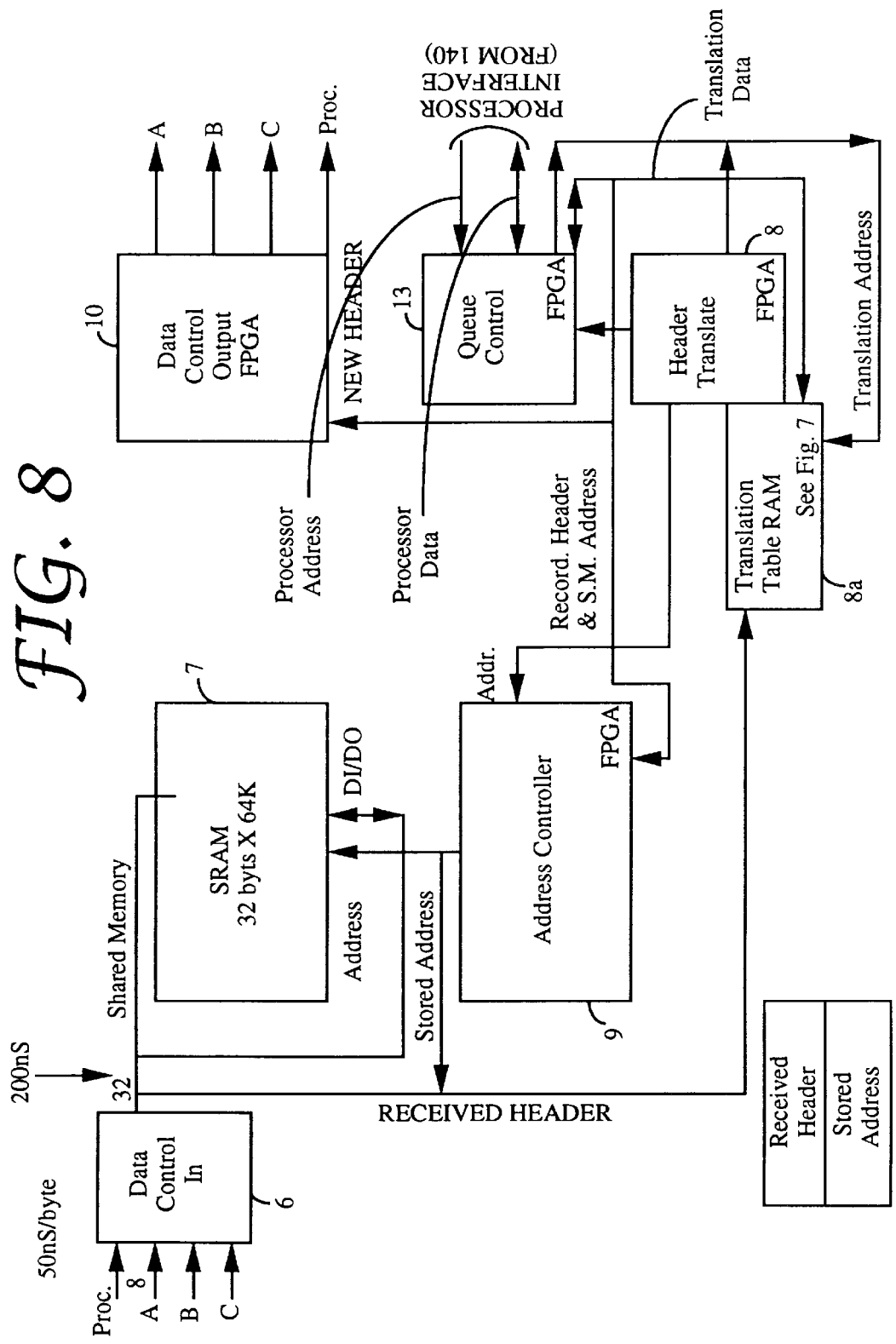
FIG. 8 is a block diagram of a subsystem for processing ATM cells.

FIG. 8 is a block diagram of a subsystem for processing ATM cells. ATM cells are received over buses A, B, or C, or from the processor, by the Data Control In subsystem 6. The information field of the ATM cells is then placed in static RAM (SRAM) 7, while the header portion of the ATM cell is routed to the Header Translation subsystem 8. The Address Controller subsystem 9 generates an address for placing the ATM cell information field in SRAM 7. The Header Translation subsystem 8, along with the Translation Table RAM, converts the received header, the VPI field and the VCI field to a new VPI field and, where appropriate, a VCI field. The Address Controller 9, after the header translation has been completed, is signalled by the Queue Control subsystem 13, and the Address Controller subsystem 9 addresses the information field corresponding to the new header field generated by the Header Translation subsystem 8, so that the header, along with the information field, is routed to the Data Control Out subsystem 103 over either bus A, bus B, or bus C.

Figure 9:
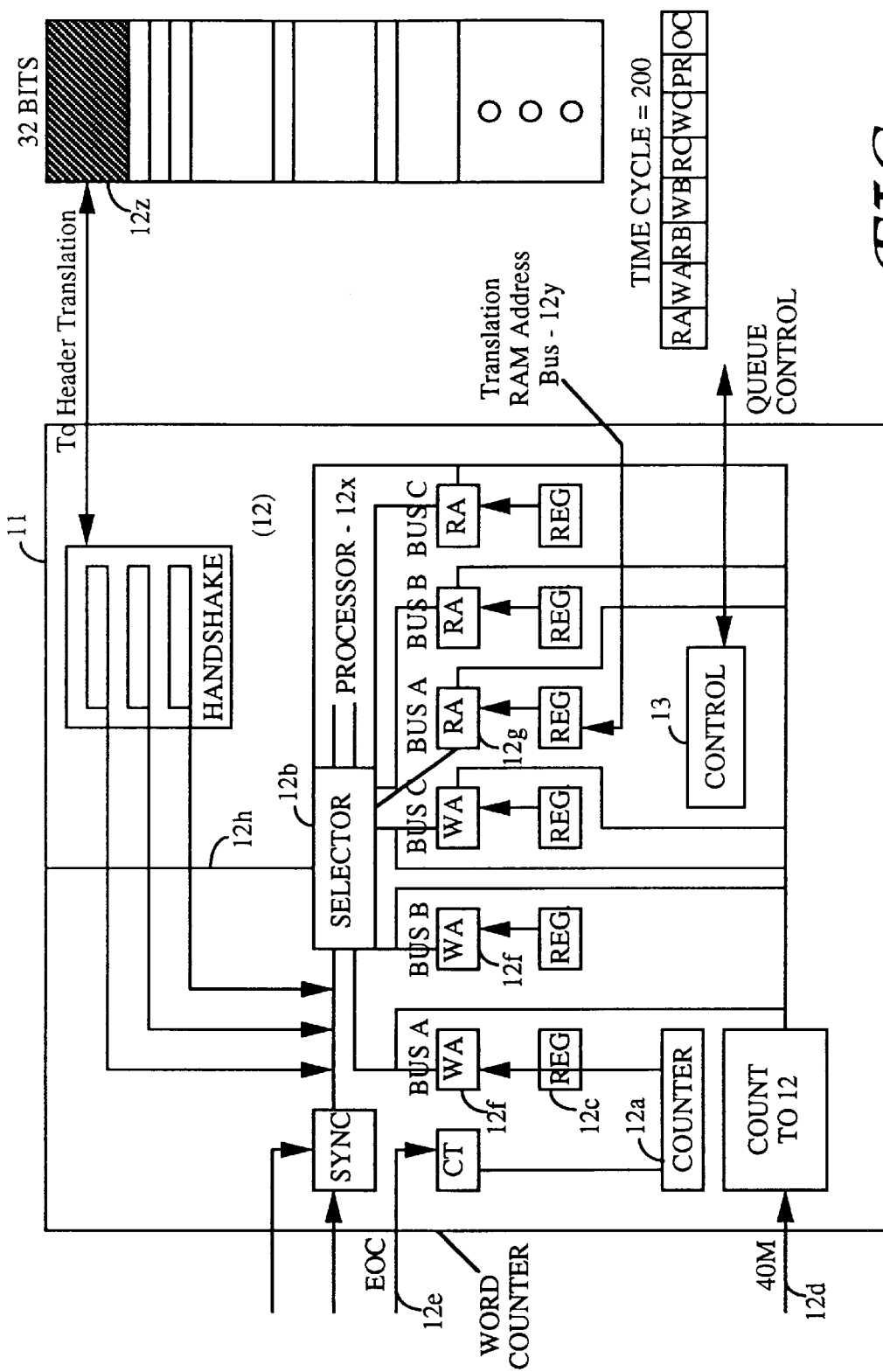
FIG. 9 illustrates a block diagram of a shared memory and a shared memory address generation system.

FIG. 9 illustrates a block diagram of a shared memory 11 and a shared memory address generation system 12. The shared memory is organized into 16 word blocks (not shown). The address generation system 12 includes an address counter 12a, a write address generator, two double buffered base address registers 12c associated with each ATM cell bus, a selector 12b, and associated control and synchronization logic driven by a 40 MHz clock 12d and am EOC (end of cell) signal 12e.

The function of the shared memory 11 is to store ATM cell data. Since only 13 of the 16 words in each block of shared memory are used to store ATM cell data, the address counter 12a that generates the least significant bits of the address is a four-bit counter. The four bits of the address counter 12a are concatenated with the contents of the base address registers associated with each bus in order to generate a shared memory address. The base address for each of the three write registers is generated by the write address generator, which is a counter 12a that is incremented by a combination of an EOC (end of cell) signal 12e and a 200 nanosecond clock signal (not shown). The base address for the three read registers is provided by the header translation RAM 12y.

The synchronization logic provides gating signals to the registers to permit them to strobe in new data every 200 nanoseconds, and control signals to the WA 12f and RA 12g registers for strobing data into those registers.

In one mode of operation, the address generation system works on a 200 nanosecond cycle. Every 200 nanoseconds, a synchronization signal, EOC signal 12e, arrives at the address generation system 12 to reset the address counter. The address counter 12a then sequences through the thirteen words of a sixteen word block. Every twenty-five nanoseconds, for the first 150 nanoseconds of a 200 nanosecond cycle, a read or write base address for one of the three buses, bus A, bus B, or bus C, is routed by the selector to the shared memory 11 to perform the required read or write operation. The last 50 nanoseconds of each 200 nanosecond cycle are allocated for a processor operation on the shared memory (memory located above the memory addressed by the write address generator 12f).

The 200 nanosecond cycle of the address controller 9 (FIG. 8) is split into eight twenty-five nanosecond time slots.

Each of the time slots defines a time in which a particular function is performed. During time slots one, three, and five, data is read from shared memory and placed on buses A, B, or C, respectively. During time slots two, four, and six, data is written to shared memory from buses A, B, or C, respectively. Time slots seven and eight define time slots for microprocessor access to memory.

In an alternate mode of operation, the processor 12x can write to reserve memory (not shown) in shared memory 11 during time slots seven and eight. The processor places address information on the selector bus 12h, places data on the data bus 200 (see FIG. 1), and when the processor access sub-cycle or time slot for processor access arrives, data is written into reserved memory in shared memory 11. Thus, the processor can access the sixteen blocks of reserve memory. The processor loads intermediate buffers, and once every 200 nanoseconds, reserve memory is written.

For a read operation, the header translator 12y sends the address that corresponds to the cell to be read out of shared memory 11 to the RA buffer registers 12g. The address comes from the translation RAM data bus under the control of the header translator along with an address that was generated from the queue control 13. Control signals from the header translator 8 cause the address to be written into the RA 12g register from the buffer register at the time it is to be used as the base for the output address.

The output of the write registers WA, WB, and WC, corresponding to each of the buses A, B, and C, is routed to the translation logic unit 12z. Each of the output write registers is designed to provide access to the translation logic unit for a longer period of time than they are provided to the shared memory 11. If equal speed access translation logic were used, the address output of the selector 12b could be fed directly to the translation logic. However, the configuration used permits virtual asynchronous operation, with the only requirement that the operation fall within the master clock cycle, so the process must be completed within one cell time.

For the purpose of achieving high speed operation, the addresses are double buffered. For example, in the case of writing to shared memory from bus A, register WA 12f holds the current memory addresses and REG 12c holds the memory address for the next cycle. Double buffering permits the loading of the next cycle address values, while the current address value out of the WA register is being used.

Figure 10:
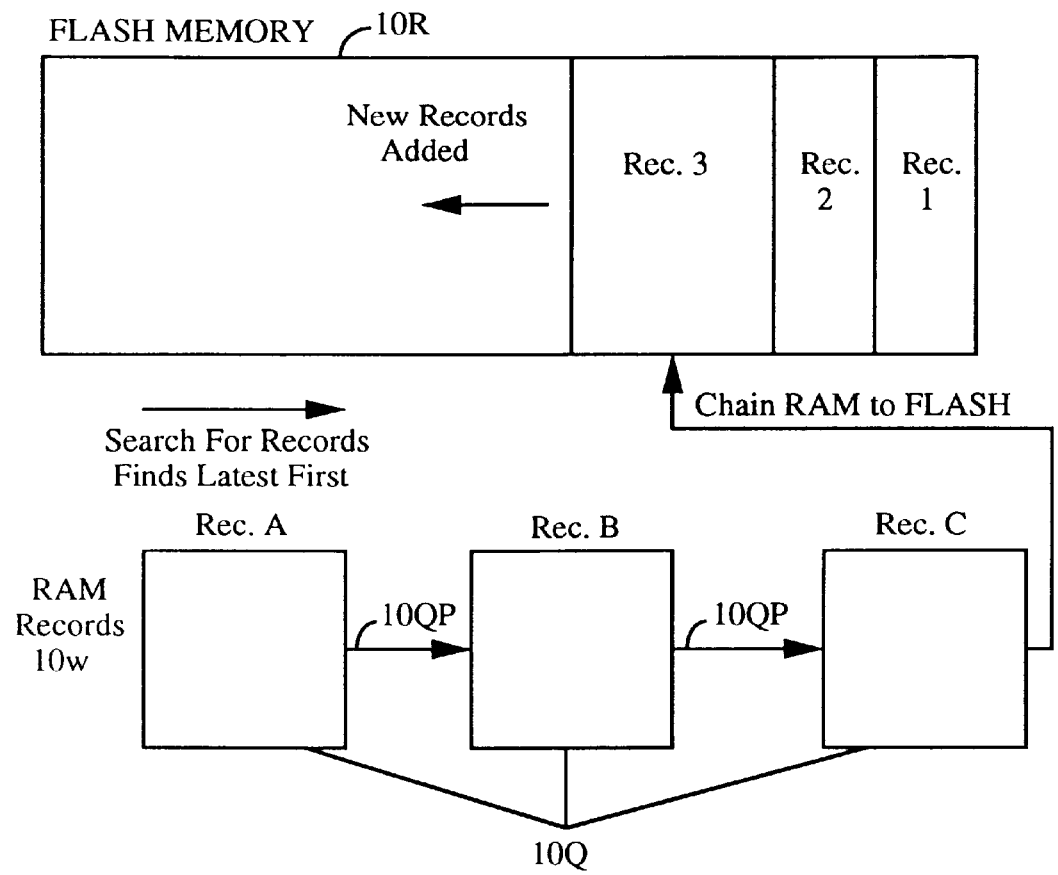
FIG. 10 is a block illustration of the invention's hierarchical use of flash memory and RAM records.

FIG. 10 illustrates the system's hierarchical use of flash memory 10r and RAM records 10w. Flash memory is used for permanent storage. The system configuration records can be stored either in RAM or flash memory, or may be split between RAM and flash; configuration records in either RAM or flash are configured as a single linked list 10q. The linked list 10q provides a pointer 10qp from each record to the next record in the linked list 10q. With this architecture, RAM and flash records can be mixed and searched efficiently. This is accomplished by searching in the reverse order of allocation, so that the most recently updated record is encountered first. The main advantage of flash memory in this system of the invention is to provide a second level of permanent storage, while RAM provides temporary storage. This two level storage architecture permits temporary as well as permanent record modification, and the temporary modification provides flexibility in conducting system tests and implementing quick fixes. In addition, flash provides a user with the powerful capability to reconfigure the invention by merely reloading the flash memory with the new system configuration.

Figure 11:
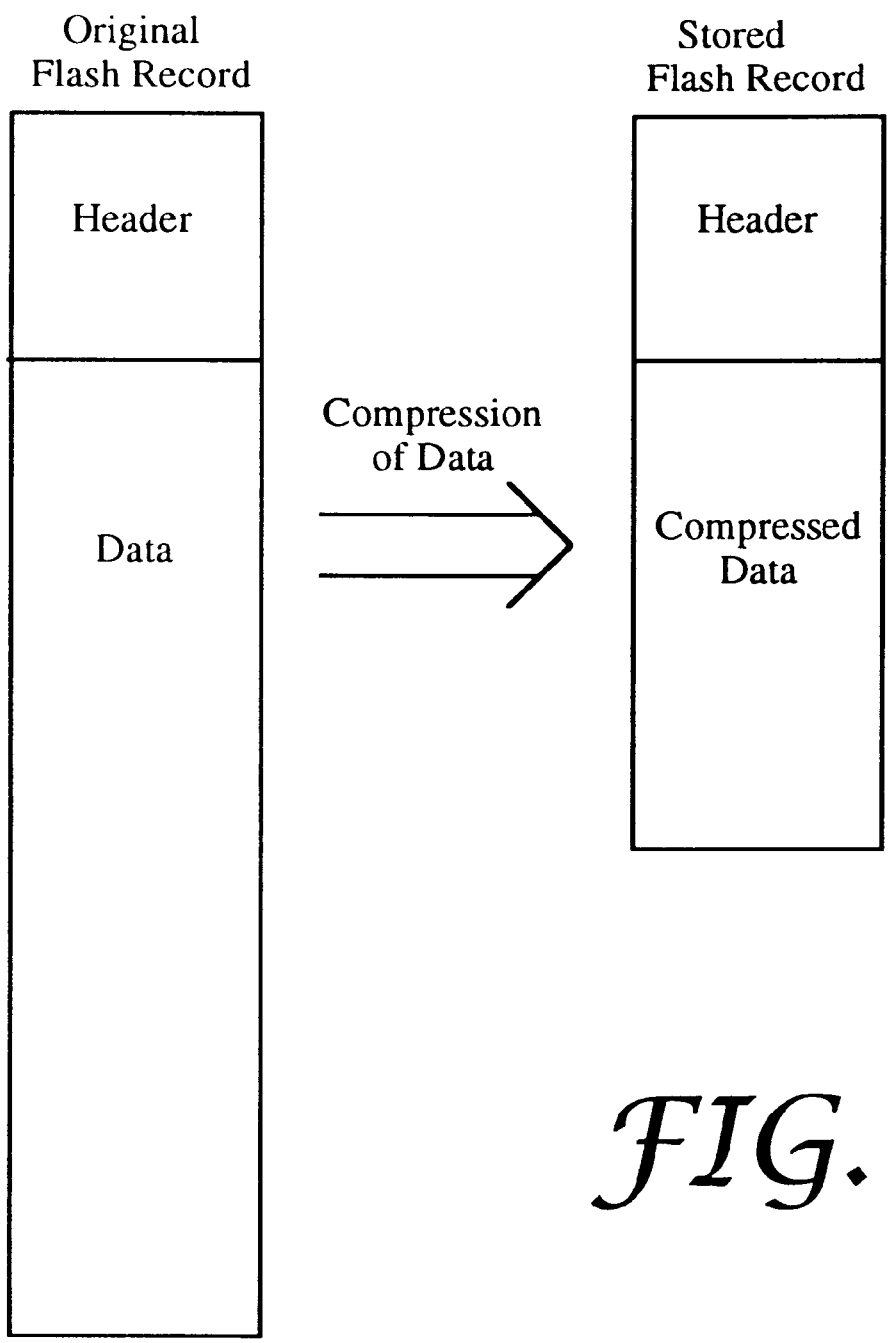
FIG. 11 is a block diagram illustrating the process of flash record compression provided by the present invention.

FIG. 11 illustrates the process of flash record compression. For the purpose of conserving flash memory, information stored in flash memory is compressed before storage in flash memory and decompressed before processing. Specifically, flash records are compressed on a byte basis to achieve two-to-one compression before storage in flash memory and are decompressed before processing. In a power up operation, the system configuration, which is stored in flash memory in a compressed form, is decompressed and loaded into RAM. The system then boots from RAM. In an ATM cell storage operation, an ATM cell is compressed before storage in flash memory and is decompressed when retrieved from flash memory.

Figure 12:
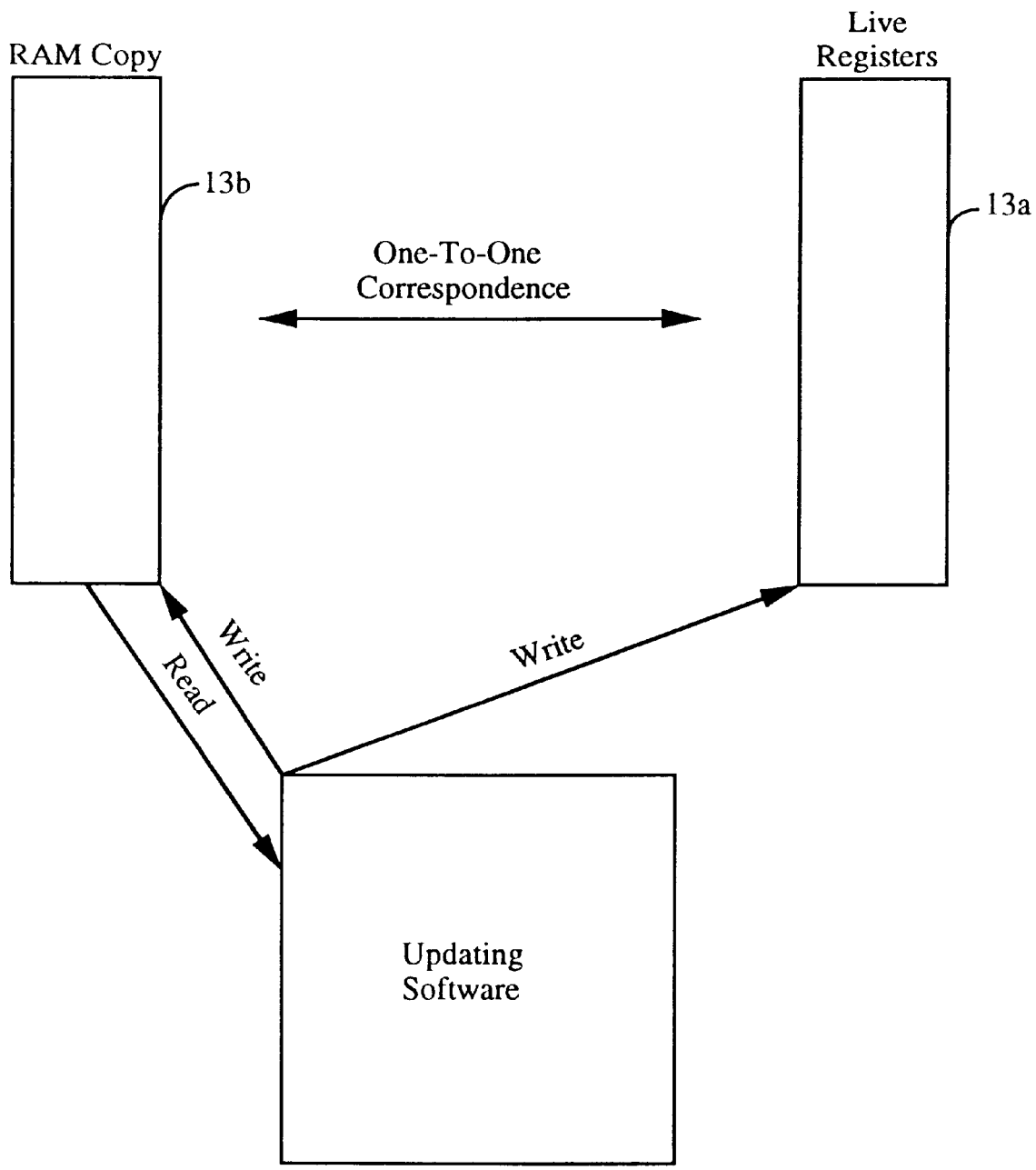
FIG. 12 is an illustration of the invention's use of RAM to simulate hardware registers which are write only.

FIG. 12 is an illustration of the invention's use of RAM to shadow, or to simulate, live hardware registers 13a, which are write only. Each time the software writes to the live registers, it also creates or writes to RAM to create a RAM copy of the contents of the live registers 13a. When the software needs to know the contents of the live registers, it merely reads RAM to obtain that information. The advantages of having a RAM copy are that it saves hardware costs in lines (or pinout) on the chips, and it permits faster reading of the data (without disrupting hardware access to the line registers). Algorithms have been written to test whether the live registers 13a are working properly.

Figure 13:
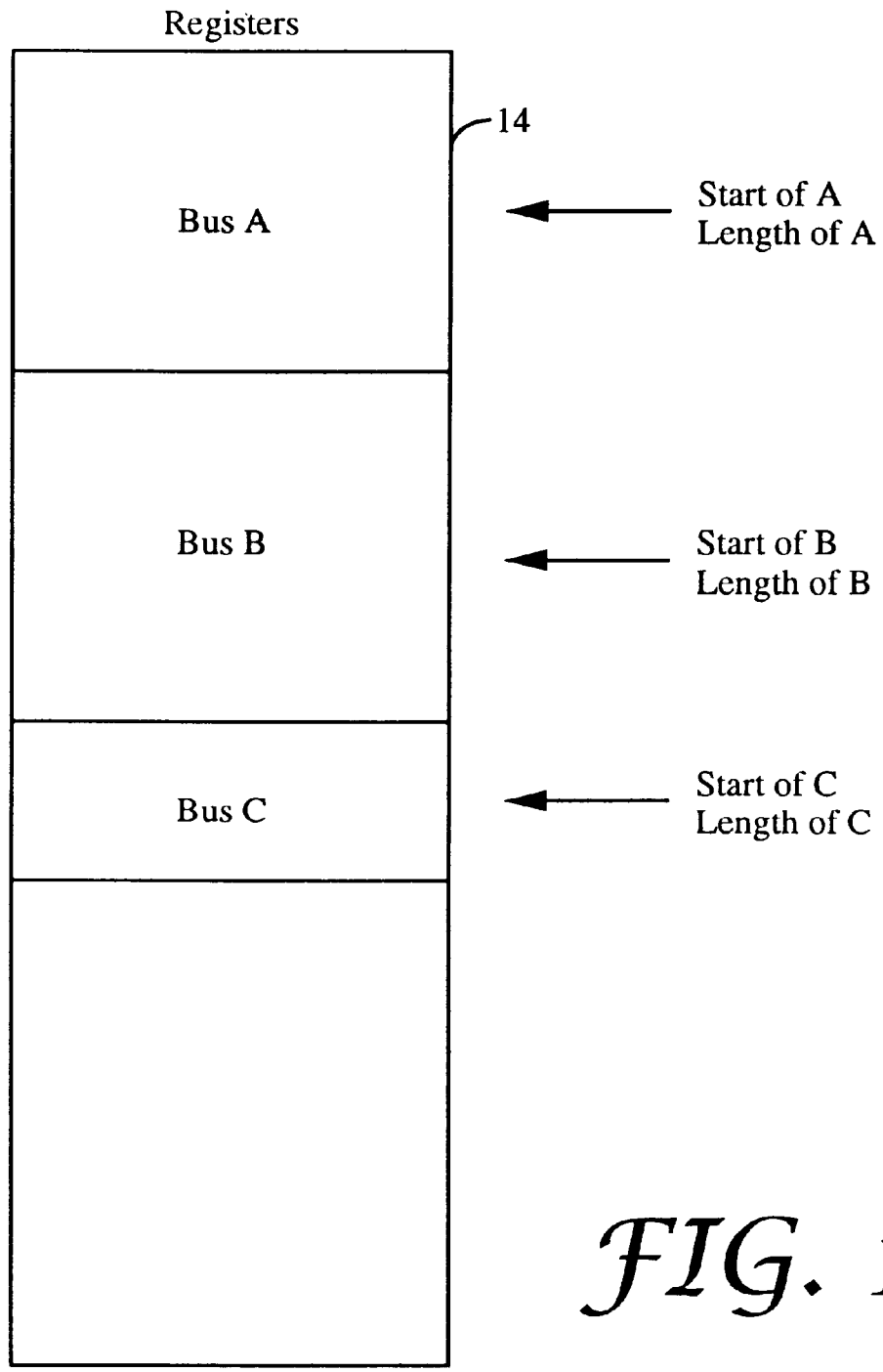
FIG. 13 is a block illustration of a tracking structure provided by the present invention for tracking the configuration of I/O adapters coupled to the system and for tracking the slot location within the system.

FIG. 13 is an illustration of a tracking structure 14 for tracking by cell bus 200 (see FIG. 1) the configuration of I/O adapters 150 coupled to the system and for tracking the slot location of cards within the system. The structure as illustrated can support up to twenty slots, depending on the configuration of the system. The tracking structure 14 is divided into three groups (A, B, C). The first group in the structure applies to slots occupied and communicating over bus A, the second group in the structure applies to slots occupying and communicating over bus B, and the third group in the structure applies to slots occupying and communicating over bus C.

Within each group, group A, group B, and group C, slots are listed in increasing order from the lowest slot to the highest slot. This tracking structure 14 permits optimal operation of an algorithm for tracking and updating the structure of the physical system. The ordering of the list also affects the priority order of transmission. The tracking structure just described also has a corresponding bank of live registers (not shown). This hardware/software combination structure permits the addition and deletion of cards as they are added to or removed from a bus. It is independent of the number of currently operating cards on a bus, and the removal or addition of a card to the bus has no affect on the other operating cards on the bus. The registers are configured such that they may be shifted up or down depending upon where a new card is to be inserted or removed.

Figure 14:
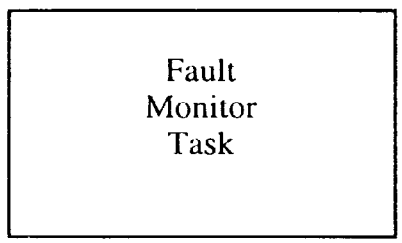
FIG. 14 is a block illustration of a structure and method for testing the wellness of the system of the invention.

FIG. 14 is an illustration of a structure and method for testing the wellness of the system and whether messages (task requests) are being executed by tasks. In normal operation, a task periodically reads its message queue and executes when a message is present. A fault monitor task periodically, approximately every one-half second, monitors a set of registers indicating a count for the number of times each task has been executed. If the task count registers for a given task has not changed since the last query, the fault monitor task issues a message to the task whose queue has not changed. The fault monitor task waits until the task should have executed, and after that wait time, checks the task count queue to see whether it has changed. If the task count queue has not changed, the fault monitor task reloads the system.

Figure 15:
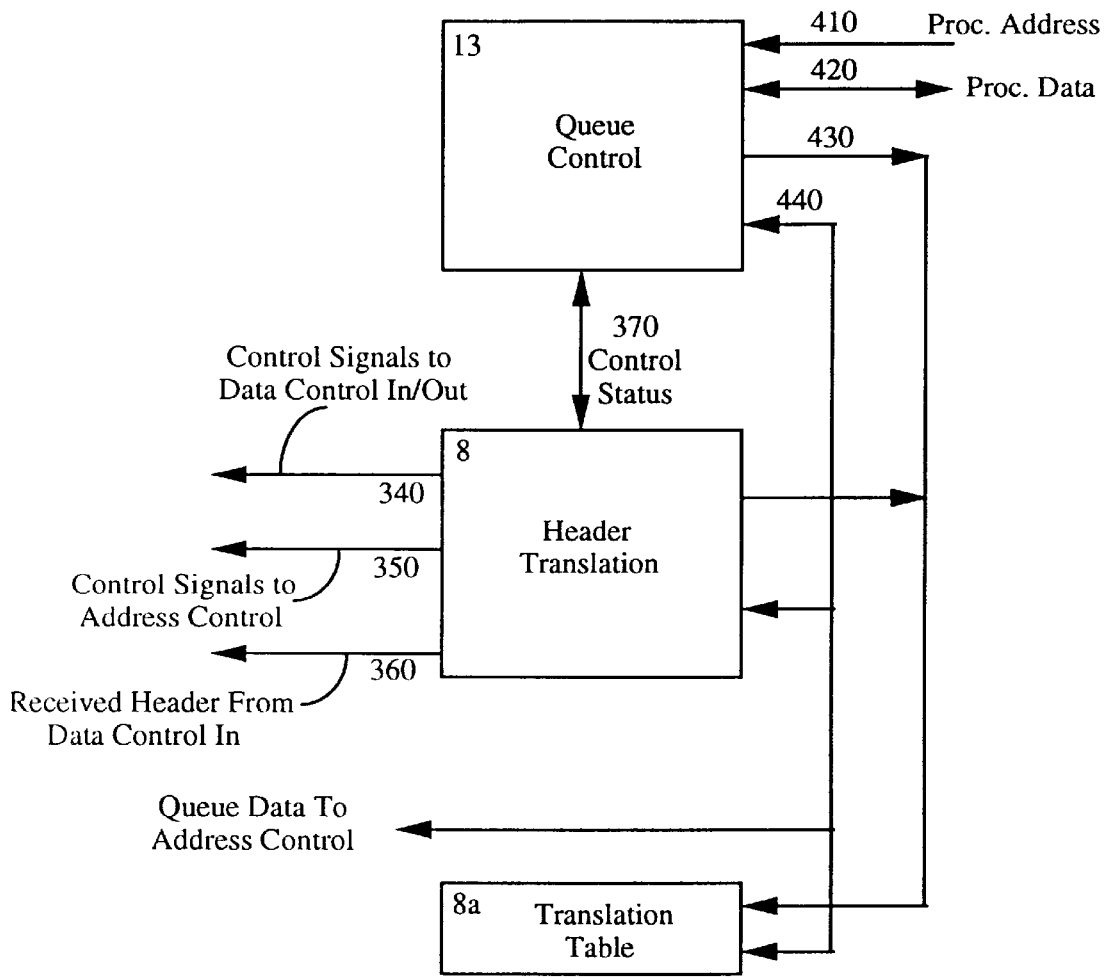
FIG. 15 is a block diagram illustrating how the processor accesses the translation table.

FIG. 15 shows a block diagram illustrating how the processor accesses the translation table. Access is achieved through the interaction of three subsystems—a queue control subsystem 13, at header translation subsystem 8, and a translation table subsystem 8a. The processor accesses the queue control subsystem 13 through a unidirectional processor address bus 410 and a bidirectional processor data bus 420; the queue control subsystem 13 is connected to the header translation subsystem 8 and the translation table subsystem 8a through a bidirectional translation table data bus 440. In addition, the queue control subsystem 13 is connected to the translation table subsystem 8a through a translation table address bus 430, including read/write control signals; and the queue control subsystem 13 is connected by a bidirectional control and status bus 370 to the header translation subsystem 8. The header translation subsystem 8 is connected to both the queue control subsystem and the translation subsystem by the translation table address bus 440. In addition, the header translation subsystem 8 is connected to the translation table subsystem 8a and the queue control subsystem through the translation table data bus 440. The header translation table subsystem 8a takes in header and data controls, and sends control signals to data control and control signals to data address control. This structure, including registers in the queue control subsystem 13, registers in the header translation subsystem 8 and registers in the translation table subsystem 8a, permits the processor interface to selectively load the translation table with either VCI or VPI data, and to selectively read the VCI or VPI translation table (FIG. 7).

Figure 16:
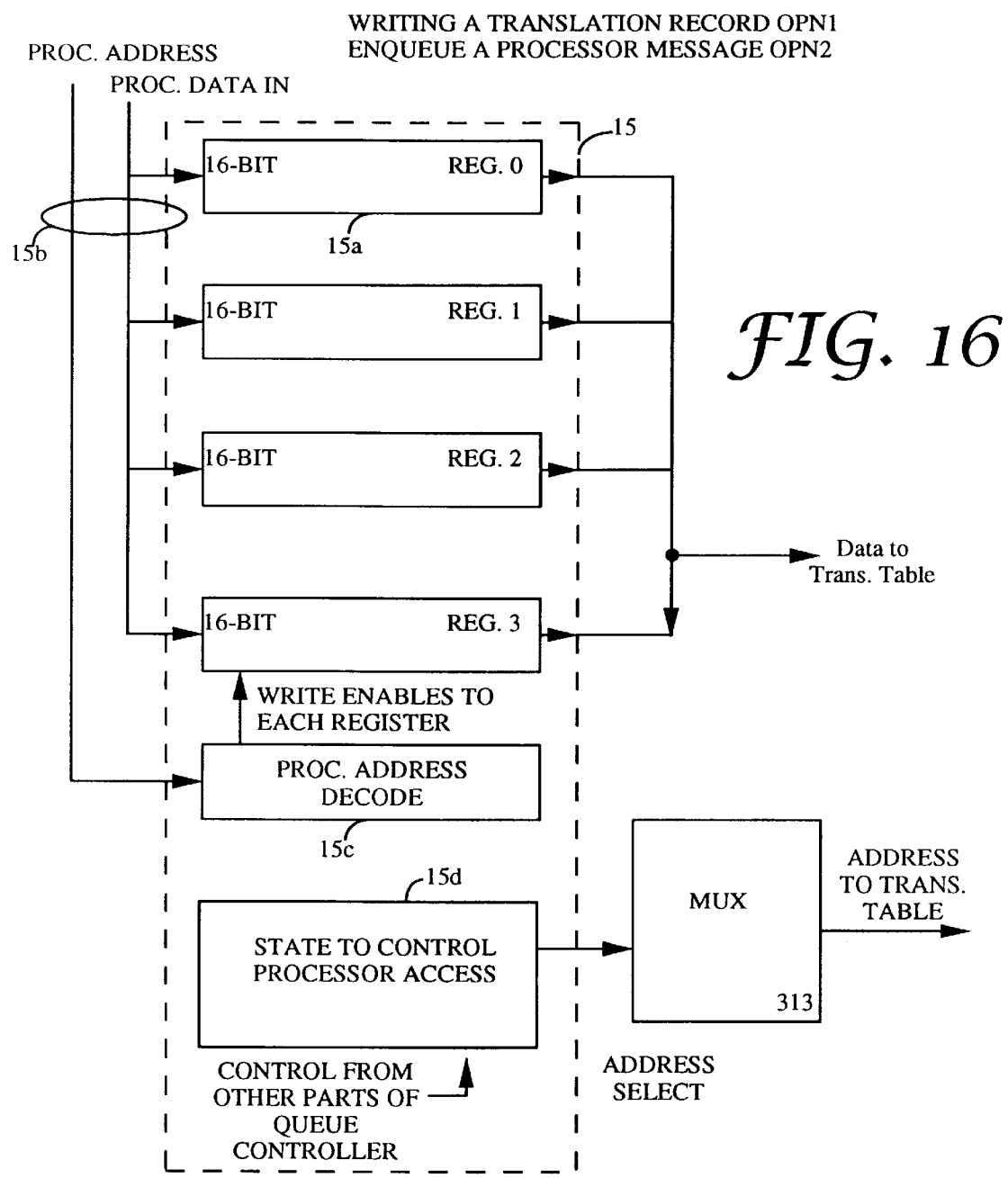
FIG. 16 illustrates a write structure for writing translation records from the processor to a translation table.

FIG. 16 illustrates a write structure 15 for writing the translation record from a processor to the translation table. This structure includes a 16-bit processor data bus and a processor address bus, constituting a processor interface 15b. The processor data bus feeds each of four 16-bit registers 15a. The output of the four registers, register zero, register one, register two, and register three, feed a 32bit data bus, and the 32bit data bus feeds the translation table. The loading of the four 16bit registers 1Sa from the processor data bus is controlled by the processor address decode subsystem 15c. The processor address decode subsystem 15c generates write enable signals to each of the four 16bit registers. In addition, a state machine 15d, to control the processor access subsystem (not shown), is connected to the header translation subsystem 8 of FIG. 15, and this state machine 15d generates address select signals to address the translation table.

FIG. 17 outlines a six-step process for writing a 32 bit translation record to either the VCI translation table or the VPI translation table.

Step A: the processor writes the upper half of translation record word zero into register zero.

Step B: the processor writes the lower half of the translation record word zero into register one.

Step C: the processor writes a don't care to the address of the translation record word to move register zero and register one into the translation table.

Steps A, B, and C are repeated to write the second word of the translation record.

Figure 18:
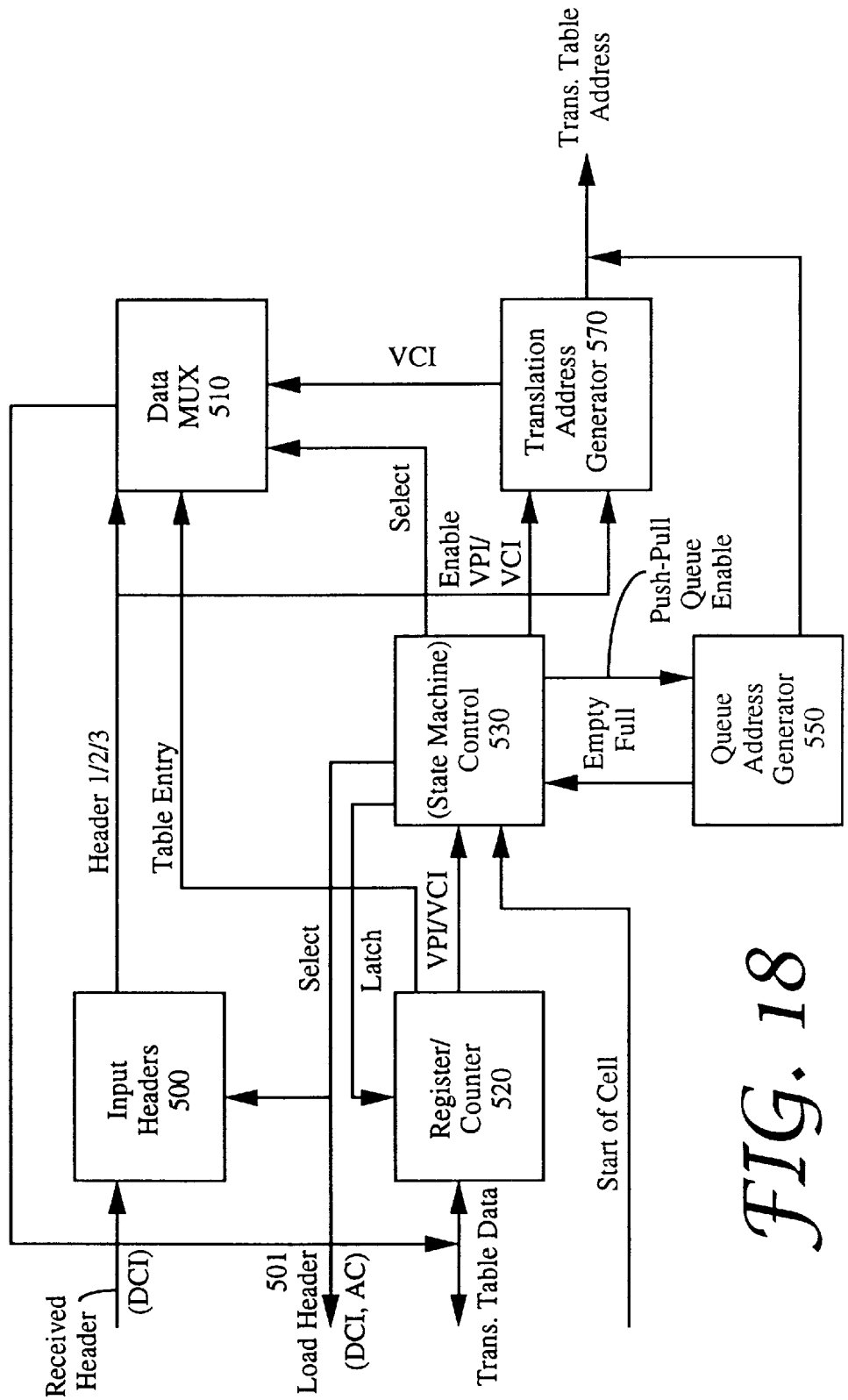
FIG. 18 is a block diagram illustrating header translation functions.

Referring to FIG. 18, there is shown a header translation functional block diagram illustrating the concepts of the header translation functions as discussed with reference to FIG. 1, 7, 8, 15 and 16.

Header translation begins when the start of cell signal is received from an interface adapter 150. Start of cell is a signal that is synchronized to the time that the header is going to be transmitted. When start of cell goes active, it means that the data control in subsystem is receiving a header from the interface adapter subsystem. A predetermined amount of time later, after the header has been received, control signals are sent to the data control in the subsystem and the address control subsystem instructing them to place that header and the cell block address that is associated with it on the received header lines which are to the input header latch section 500.

A state machine in the control section 530 is touched off by the start of cell signal, and thereafter operates on its own internal timing. Reference can be to an external clock or to an internal system clock. A system clock, not shown, feeds to every block on the diagram. Everything is synched to that clock, and all of the other control signals cooperatively function as enables.

Upon receiving start of cell, state machine controller 530 triggers the input header latch 500 to latch in the received header, and also provides an output latch header signal 501 which output signal is coupled to the data control in subsystem and the address control subsystem to tell them to place the data on the received header line so that the input header latch 500 can store it.

Register/counter 520 functions to store data that is coming in from the translation table. That is a second function of the header translator subsystem which comes later in the sequence, and will be discussed further later herein.

The input header is used to generate an address to the translation table 8f and that is based on one of the fields in the input header. The output from the input latch 500 is coupled both to the data multiplexer 510 (which will be discussed later) and is also coupled in parallel to the translation address generator 540, which responds to an enable signal from the control logic 530 to generate the translation table address at the appropriate time, responsive to the header information. When the header comes in, an address is generated in the translation table RAM to read the translation according to the VPI field in the input header.

The VPI field in the input header generates an address. The translation RAM is read based on that address, which outputs the translation data for that header. The output of the translation RAM is translation table data which is coupled to input to the register/counter 520 which latches the translation table data responsive to a latch signal generated by the control system 530, at the appropriate time, to cause the translation table data for the corresponding translation table address to be output as a table entry to the data multiplexor 510, to create a translated table entry which is read back into the translation table data lines and written back into the translation table at an address determined by the logic determined in the address generator 540. The data multiplexor 510 is responding to a select signal from the control 530, to, at the appropriate time, multiplex pieces of the header combined with pieces of what is stored in the register/counter 520, thereby creating a new header for the same cell. The purpose of this is to substitute some of the fields with new information obtained from a translation record. First, the translation table address is output based on the old header. The data for that address which is combined with the old header to generate a new header is the translation table data.

Sometimes a second step, VCI translation, takes place. What was just described is called a terminating record, where only the VPI field is used. For a non-terminating record, the VCI also comes into play. In this case, based on what was read back from the translation table, another translation address is created which goes back into the translation table using that address from subsystem 540. Based on this second (VCI) address, another entry is read out of the translation table and again is stored in the register/counter 520, and used to generate the output from the data multiplexer 510 which is then read back into the translation table. At the end of this, there is a new entry in the translation table consisting of the header that came over from the data control in subsystem modified by what was read out of the translation table at the original address and the cell ID that came over from the address control subsystem.

When creating a VCI translation, which is the above described second step, the new VCI address that is based on a combination. The translation address generator 540 responds to the original header to generate a translation table address. The translation memory responds to that address with a corresponding translation table record. The data multiplexer subsystem 510 responds to the data record obtained from the translation memory and to the original header and to the VCI output from the translation address generator 570 if one has been generated. The data multiplexer subsystem 510 performs functions beyond multiplexing, such as blending of those data values. The output of all of that is a new header containing the modified translation table data or record which includes a substituted VPI, and VCI, if the new VCI has been generated.

What is written back into the translation table at the original address is the original header with the cell count field incremented. That is why there is a counter 520. That field gets read in, incremented and then the entire word with that new field is written back. Note that it is not a header writing back in, it is the first word of the original look-up table record. The header and the cell ID between them make up a "queue entry". A queue request is sent to the queue address generator 550, which is physically in a separate logic block. However, conceptually it is still a part of the header translation function. The queue address generator 550 determines an address in the translation RAM where this queue entry is going to be written.

Under the control of the state machine control signals, this address is enabled on to the translation table address lines and the data which comes through the data multiplexer 510, is actually written into the translation table memory. That takes care of the input headers for the input cells that have been received. Now during this same cell time (which is triggered by the start of cell signal), after taking care of the input headers, each of the three output queues (FIG. 9) is checked to see whether there is a data word in any (or all) of them to be set up. The output queues are checked by looking at the queue empty signals from the queue address generator 550, and if any of them are not empty, then a queue push request is sent to the queue address generator 550. It generates the address for the oldest entry in the queue that has been selected, and puts that address on the translation table address lines, which, in conjunction with the control signals from the state machine 530, causes the data from that corresponding address in the translation table to be read. If a non-empty queue is found, it is read, pulling the entry off of that queue. If there is more than one queue that is not empty, only one of them can be used. The system permits output of one cell per cell time for each queue.

Whether or not a received header is present, when the periodically occurring start of cell signal occurs, a cell is processed via the queue address generator 550. When there is a received input header, it is first translated, and it's translated record value is stored at an appropriate address in the translation table, and then in addition a cell is processed if there is a non-empty queue. All access to the translation table memory is accomplished through the queue process.

Figure 19:
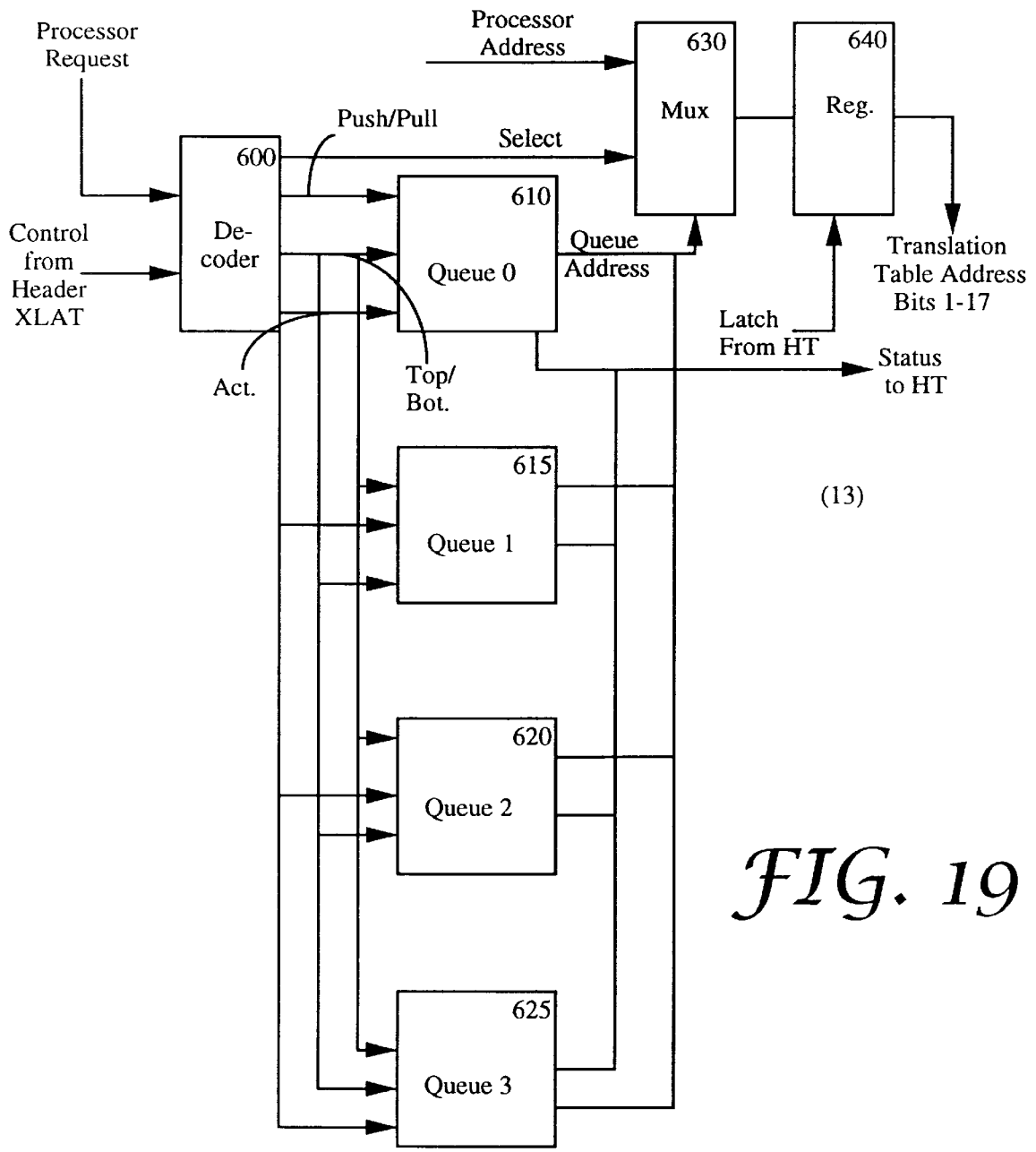
FIG. 19 is block diagram illustrating the queue control logic subsystem of the invention.

FIG. 19 illustrates the queue control logic subsystem 13. This system consists of a decoder 600, a queue zero 610, a queue one 615, a queue two 620, a queue three 625, a multiplexer 630, and an output register 640. Input control signals include a processor request signal, a processor address signal, and a control signal from the header translator (not shown), and a latch from the header translator. Output signals from the subsystem 13 include status to the header translation and transition table address. In FIG. 19, the queue control provides the translation table addresses. It responds to signals from the header translator. The header translator can do a push or pull on one of four queues. If the header translator is working with queue one, and is going to do a push, the next address has already been determined. That address is latched by a signal from the header translator and that address will be used by the header translator. After the address is latched, the header translator tells the queue to do the push. Each queue 610, 615, 620, 625 contains 2048 storage locations. Illegal operations are avoided by having the header translator look-up empty and full bits. Subsystem decoder 600 consists of a 2-bit address decoder.

Figure 20:
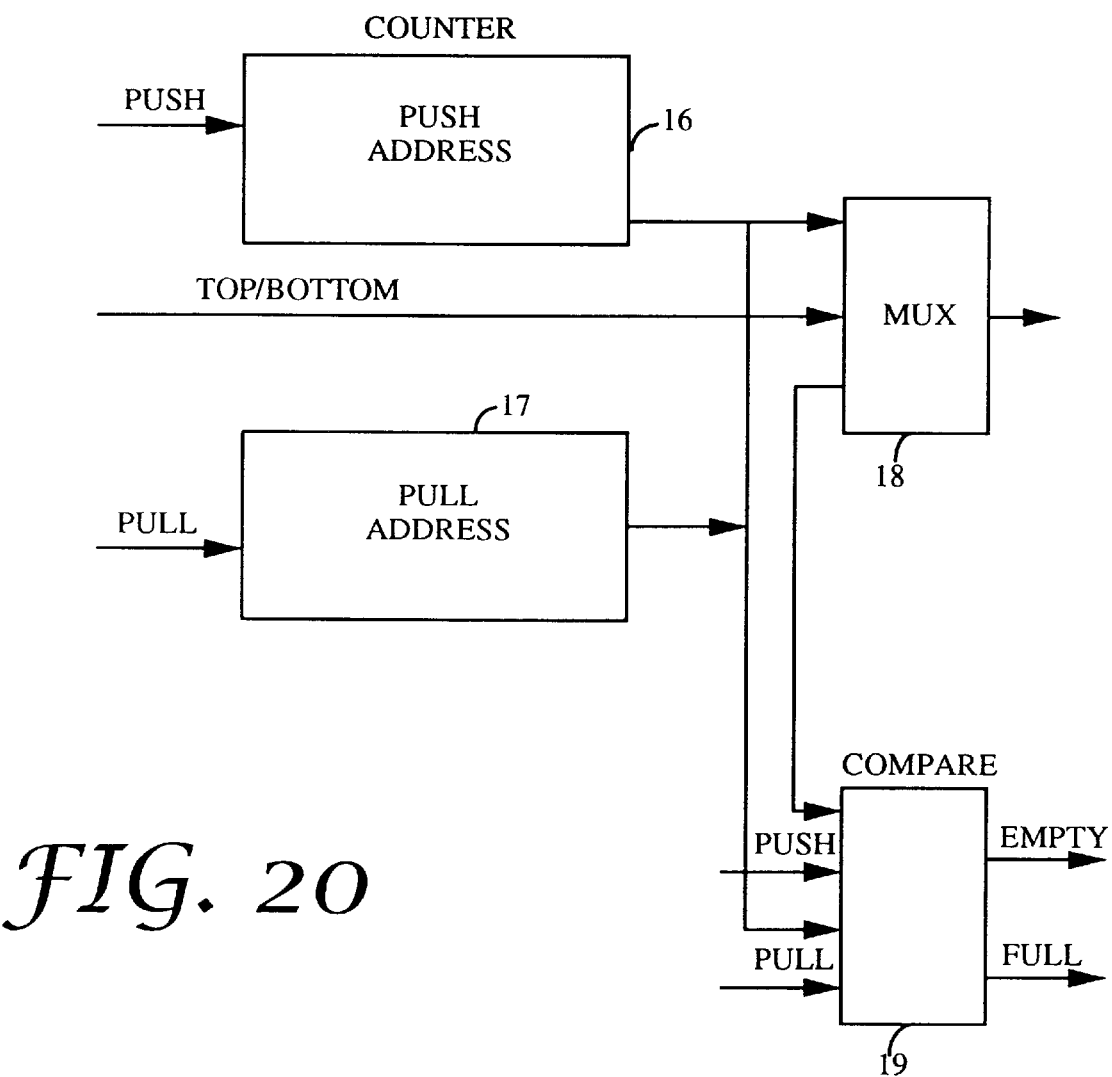
FIG. 20 is a block diagram of the queue subsystem logic of the present invention as shown in FIG. 19.

FIG. 20 illustrates the logic residing in each of the queue subsystems 610, 615, 620, and 625 illustrated in FIG. 19. Input signals push and pull are input to a push address counter 16 and a pull address counter 17, respectively. The outputs of the push address counter and the pull address counter feed a multiplexer subsystem 18 and a compare subsystem 19. A top/bottom signal controls the multiplexer 18 by determining whether the push counter address subsystem 16 or the pull counter address subsystem 17 will be gated. Outputs of the compare subsystem include an empty and full signal. Output from the multiplexer 19 is either the output from the push address counter or the output from the pull address counter as gated by the top/bottom signal. The output of the push address counter is compared to the output of the pull address counter in the compare subsystem to determine whether the queue is empty or full, and the compare subsystem outputs two signals, empty and full.

Figure 21:
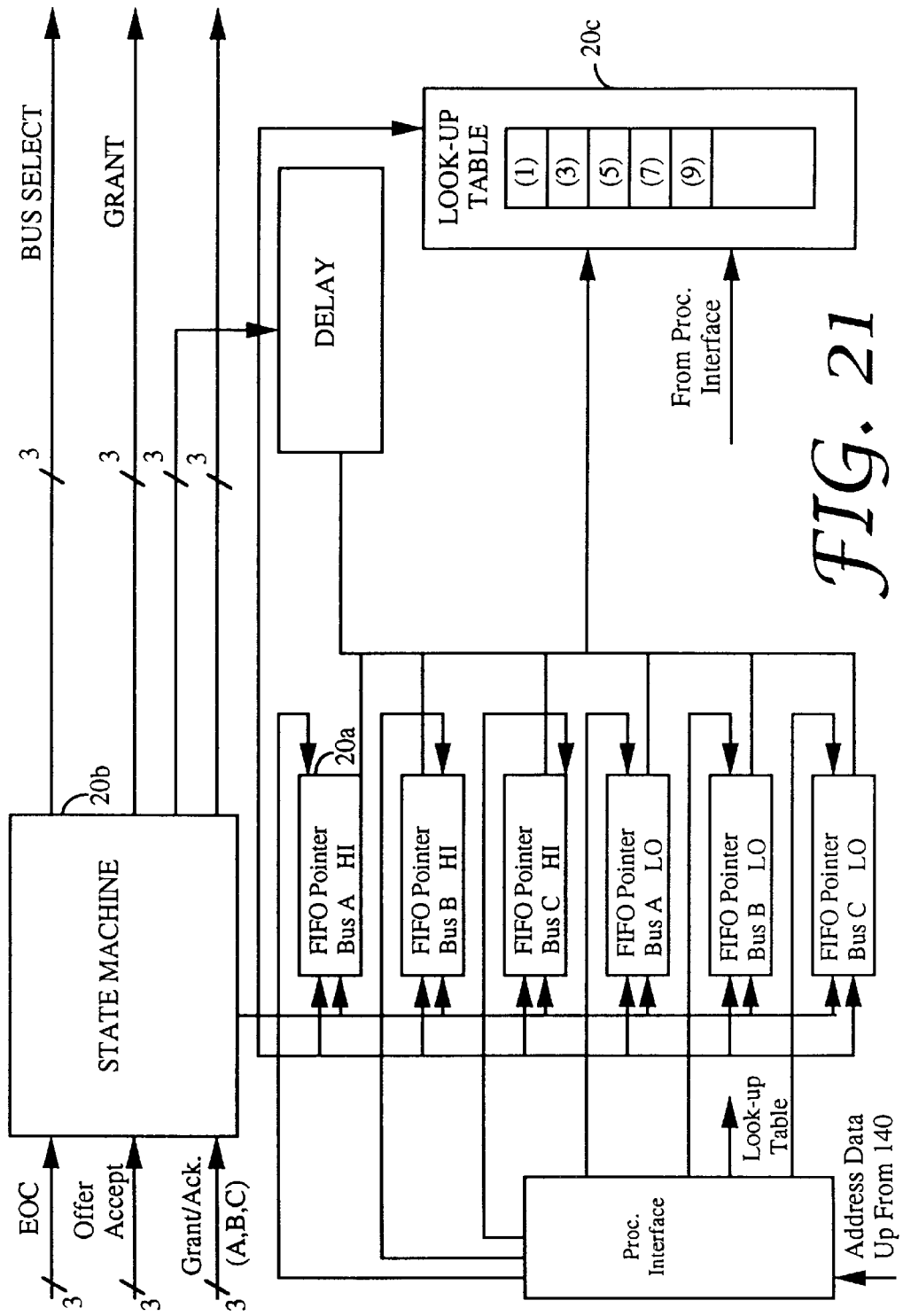
FIG. 21 is a block diagram of the bus master arbitration subsystem.

FIG. 21 illustrates the bus master arbitration subsystem 20. The purpose of the bus master arbitration subsystem 20 is to provide a structure and mechanism for allocating ATM cell buses A, B, and C to selected adapter cards 150 in an efficient and high speed manner. Once an adapter card has been allocated an ATM cell bus, the adapter card is free to transfer ATM cells over the allocated bus 200. The bus master arbitration subsystem is programmed and controlled by the microprocessor interface 140. The processor interface subsystem 20 of the bus master arbitration subsystem directs data and control signals to FIFO pointers 20*a* and a state machine 20*b*. The FIFO pointers provide a comparative method of allocating a bus to an adapter card 150 depending on whether the adapter card has been assigned a high priority or a low priority.

Information from the FIFO pointer subsystem 20*a* is combined with information in a table look-up subsystem 20*c* to generate a slot address in order to allocate access to an ATM cell bus to a given adapter card. The state machine 20*b*, under the software control of microprocessor bus 140, sends the physical bus select signals and grant signals to the adapter bus and ultimately to the selected adapter card 150. The adapter cards return and offer an accept signal and a grant acknowledge signal for each of the three buses A, B, and C. These signals are returned to the state machine subsystem. After an adapter returns an offer accept and a grant acknowledge, it is free to transfer ATM cells on the ATM cell bus. The state machine 20b may also send a signal to the adapter cards to disable, in effect take away bus rights, from a given adapter card, in order to give the rights to another adapter card. The list for allocating bus priority and arbitrating between adapter cards is a circular polling list, and when a bus becomes available, the bus master arbitration subsystem dynamically continues allocation where it last left off in the circular polling list. When the bus is taken from an adapter card and the bus subsequently becomes available, the bus is offered back to the card it was taken from. The EOC signal, which is an input to the state machine, is a timing signal. In effect, an arbitration control bus, which selects and grants permission to use the ATM cell data bus, is granting access to buses A, B, or C three times during each cell time.

Figure 22:
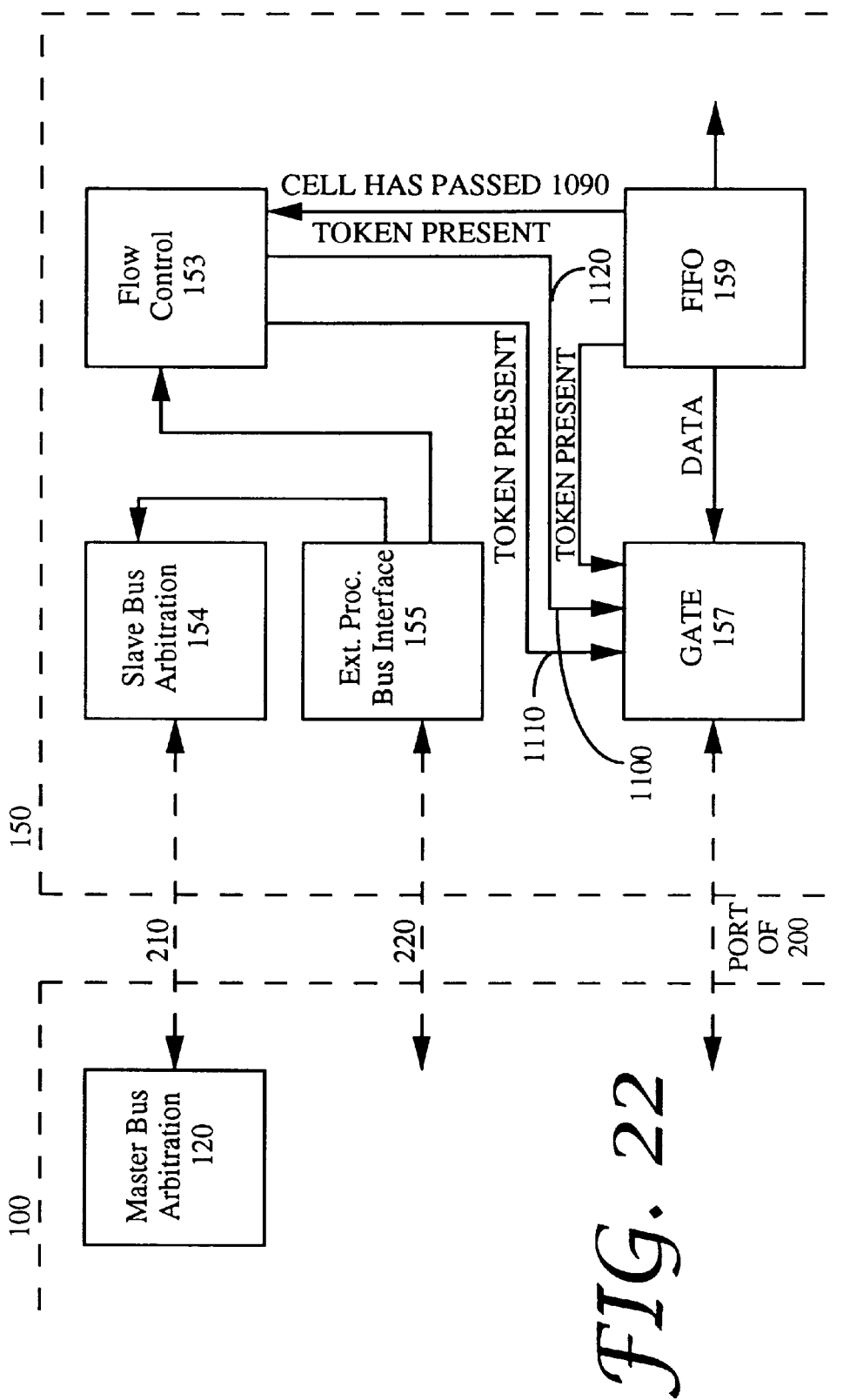
FIG. 22 shows a cell flow block diagram detailing the cell flow from the interface adapters to the switch core of the invention.

FIG. 22 illustrate, a cell flow block diagram detailing the cell flow from interface adapter 150 to switch core 100. The interface adapters 150 that are connected to switch core 100 and to the cell bus 200 are designated to take either bus A, bus B, or bus C on bus 200. Once bus A, bus B, or bus C has been selected, cells may flow between switch core 100 and the interface adapters 150. For an interface adapter to send cells to the switch core, it must arbitrate for the bus, because more than one interface adapter may be sharing a particular bus. Slave bus arbitration circuit 154 communicates with master bus arbitration subsystem 120 across the arbitration control bus 210. The handshaking protocol across bus 210 includes offering the bus 210 to the interface adapters 150, and as the interface adapter receives an offer, it can either accept it or reject it. If an adapter accepts an offer, master bus arbitration 120 follows up to the interface adapter that the acceptance was granted. The grant is passed along bus 210, and slave arbitration circuit 154 acknowledges that grant, returning the signal to master bus arbitration 120 through bus 210. An interface adapter 150 always accepts a bus grant when it has ATM cells in FIFO 159 to pass to the core. FIFO ATM cell data is gated through block 157, and block 157 is controlled by flow control 153 signals token present 1110 and token present 1100. In addition, gate 157 is further controlled by data present signal 1120. Bus arbitration 154 and flow control 153 both have access to external processor interface bus 220 through external processor interface 155. ATM cells may be passed from the FIFO 159 to flow control 153, over signal carrying lines 1090.

Figure 23:
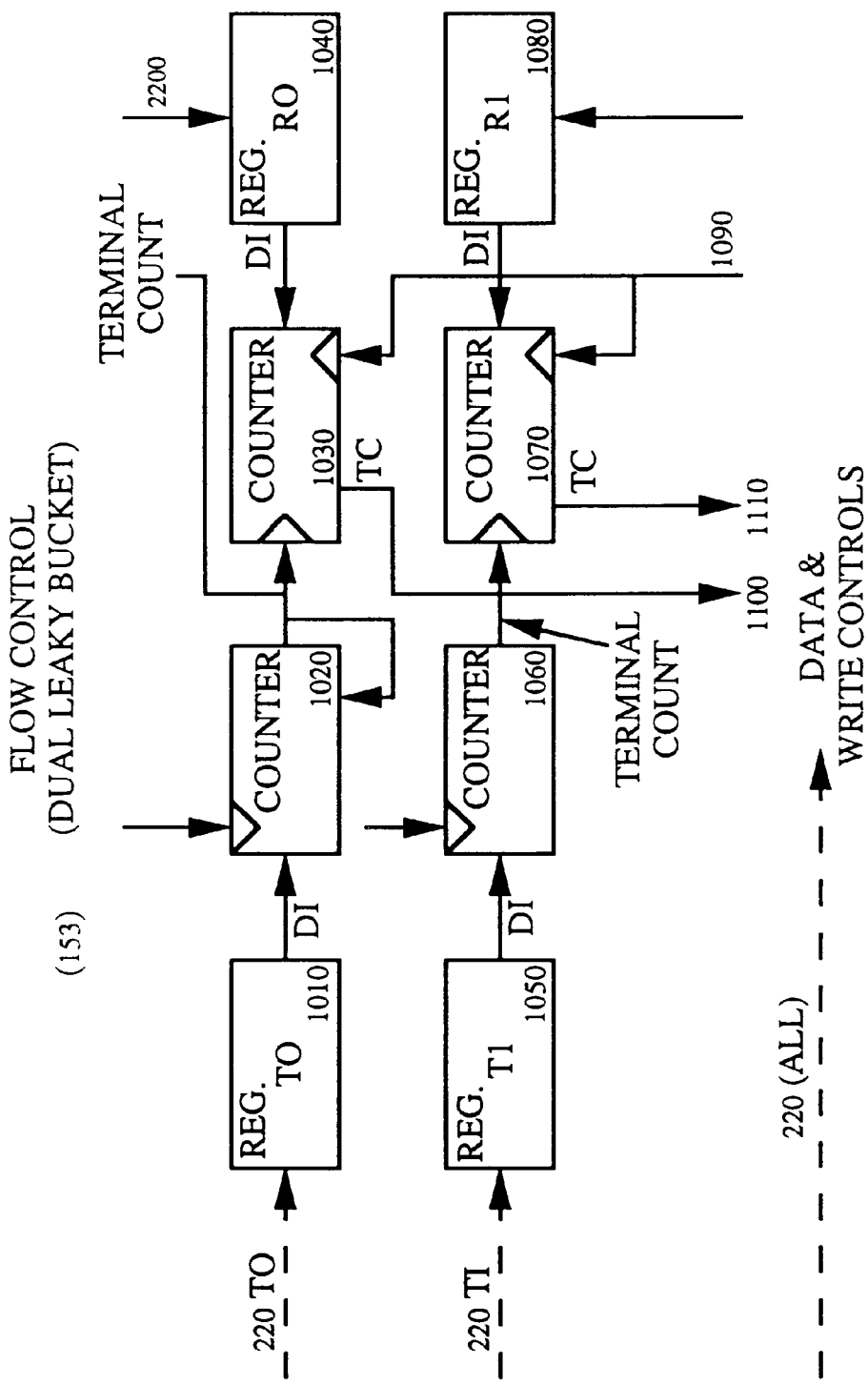
FIG. 23 is a block diagram of the data flow control mechanism known as a "dual leaky bucket".

FIG. 23 illustrates the flow control 153 mechanism, sometimes known as 'a dual leaky bucket'. Processor bus 220 loads register T0 1010, register T1 1050, register R0 1040, and register R1 1080. Register T0 1010 can be loaded into counter 1020; register T1 1050 can be loaded into counter 1060; register R0 1040 can be loaded into counter 1030; and register R1 1080 can be loaded into counter 1070. The output terminal count of counter 1020 re-loads counter 1030; and the terminal count output of counter 1060 re-loads counter 1070. Counter 1020 is decremented every 10 microseconds, and counter 1060 is decremented every 2 microseconds. Signal 1100, originating at counter 1030, is a control signal that regulates the flow of ATM cells onto the ATM cell bus, and signal 1110 is also a flow control signal that controls the flow of ATM cells onto the ATM cell bus. Decrement signal 1090, which feeds counter 1030 and counter 1070 is used to decrement counter 1030 and counter 1070. The purpose of the flow control system 153 is to regulate the flow of ATM cells onto the ATM cell bus. Every 10 microseconds, the count in register T0 1010 is decremented. When counter 1020 decrements to zero, the terminal count line, feeding counter 1030, resets counter 1030 to the value contained in register R0 1040, and resets itself to the value in T0 1010. Each time an ATM cell is placed on the ATM cell bus, decrement signal 1090 decrements counter 1030. Once counter 1030 is decremented to zero, cell flow onto the ATM cell bus is blocked by signal 1100. The operation of register T1 1050, counter 1060, counter 1070 and register R1 1080, is similar to the above described operation. The reason for having two parallel counter systems is to permit the creation of a long term average bit rate on the ATM cell bus and a short term average bit rate on the ATM cell bus. A long term average bit rate may be programmed by setting R0 and T0 appropriately, and the short term average bit rate may be controlled by setting R1 and T1 appropriately.

Figure 24:
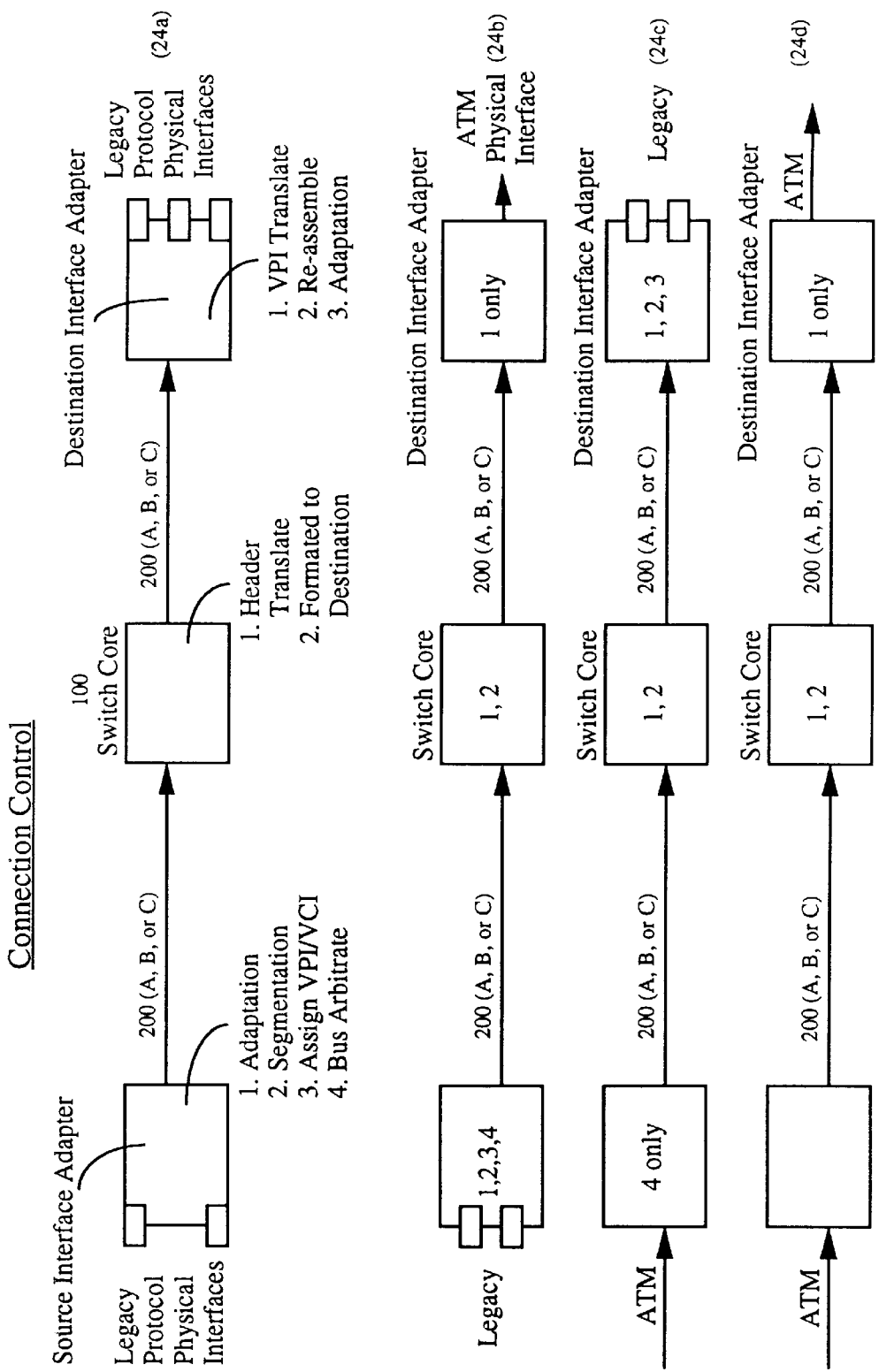
FIGS. 24A–24D are data flow block diagrams illustrating the connection control process of the present invention.

Referring to FIGS. 24A–D, a data flow block diagram illustrates the connection control process for obtaining source input, processing it, storing it in the switch core, and processing it for output through a destination interface adapter for re-output. FIG. 24A illustrates the embodiment where a legacy protocol physical interface exists, such as Ethernet or T1, which are non-ATM. FIG. 24A illustrates a legacy protocol in and a legacy protocol out embodiment. FIG. 24B illustrates a legacy protocol in and an ATM protocol output, and FIG. 24C illustrates an ATM protocol in and a legacy protocol out embodiment. FIG. 24D illustrates an ATM protocol in and an ATM protocol out embodiment. As illustrated in FIGS. 24A–D, the virtual pathways are illustrated. Thus, the interconnect cell buses can be the same or different for each of the illustrated application of FIGS. 24A–D. FIGS. 24A–D depict only the connection control function of the invention.

As illustrated in FIG. 24A, a physical interface for a legacy protocol is coupled to the interface specific circuits of the interface adapter 150 which performs the functions of adaptation, segmentation, assigning of VPI and VCI values for a header, and bus arbitration interface for purposes of communicating the adapted, segmented, and headered cells corresponding to the physical interface input data. The adaptation consists of the encapsulation or mapping of the external legacy protocol to the internal ATM protocol, and vice versa for purposes of output translation at the destination interface adapter. The segmentation process consists of breaking down the incoming data into forty-eight byte groupings for utilization in cells for passage to the switch core for storage, and thereafter for transfer from the switch core and output via an interface adapter.

For the system as illustrated in FIGS. 24A, 24B, and 24C, the forty-eight byte cell payloads from storage are adapted and reassembled for compatibility with the destination output legacy protocol. For the system as illustrated in FIG. 24B, the stored forty-eight byte cells are transferred to the destination interface adapter for VPI translation and output as ATM cells, retaining the original stored forty-eight byte structure. FIG. 24D illustrates the embodiment for ATM protocol input to the source interface adapter and ATM output from the destination interface adapter.

For the source interface adapters of FIGS. 24C and 24D, only bus arbitration functions are needed. For the source interface adapters of FIGS. 24A and 24B, all four functions are needed, that is, adaptation, segmentation, assigning VPI/VCI, and bus arbitration.

In all of the illustrated embodiments, FIGS. 24A–D, the switch core provides header translation functions and forwards to a destination queuing subsystem for output onto the cell buses 200. The processor of the switch core 100 initializes and sets up the variables and parameters for assigning VPI and VCI values for header translation purposes. Thereafter, the source interface adapter automatically assigns the predefined VPI/VCI values from the set-up parameters, which will later be transferred with the data received from the external legacy protocol physical interface and coupled to the switch core for utilization by the header translation logic.

Referring to FIGS. 24A and 24C, the stored cells are then output to a legacy protocol (i.e., non-ATM), the VPI translation is provided in accordance with pre-established parameters as established by the processor as a function of the connection control; control is provided for reassembly of the cells into the proper format (e.g., packets for Ethernet); adaptation (providing the proper additional data to properly format the packet for communication (e.g., on the Ethernet)) is provided; and finally, the cell data is output in the appropriate legacy protocol physical interface format.

As illustrated in FIGS. 24B and 24D, the switch core stored cell data is output to the destination interface adapter which performs only the VPI translation function (adding it to the header), and then outputs the stored cell data with header in the ATM physical interface format.

From the description on connection control that was just described, it can now be illustrated how the Network Access Switch (NAS) system can be configured as an "edge device". An "edge device" is a device that will map a legacy protocol physical connection into an ATM connection as illustrated by FIGS. 24B and 24D. FIG. 24B illustrates the mapping from the legacy network into the ATM network, and FIG. 24D represents the mapping in the reverse direction. The NAS system is capable of simultaneously performing both mappings with an arbitrary number of connections that can be established within the system and with any arrangement of the physical legacy ports and ATM physical interfaces that are available.

The NAS system can also be used as a blender providing the ability to optimize the use of the bandwidth on the ATM physical interface side. For Asynchronous Transfer Mode, cells and the time slots that are allocated to cells are not assigned to specific connections, but are assigned on an as needed basis. As shown in FIG. 24B, cells from legacy network connections are sent to the ATM physical interface and occupy bandwidth only when data from those physical ports actually needs to occupy that bandwidth; otherwise that bandwidth is available to other connections.

Additionally, legacy inputs from multiple different types of legacy protocols can be converted by the source interface adapters and stored in the switch core and combined for ATM physical interface output from the destination interface adapter, so that incompatible source protocol inputs can be blended and output from a single ATM physical interface link.

Figure 25:
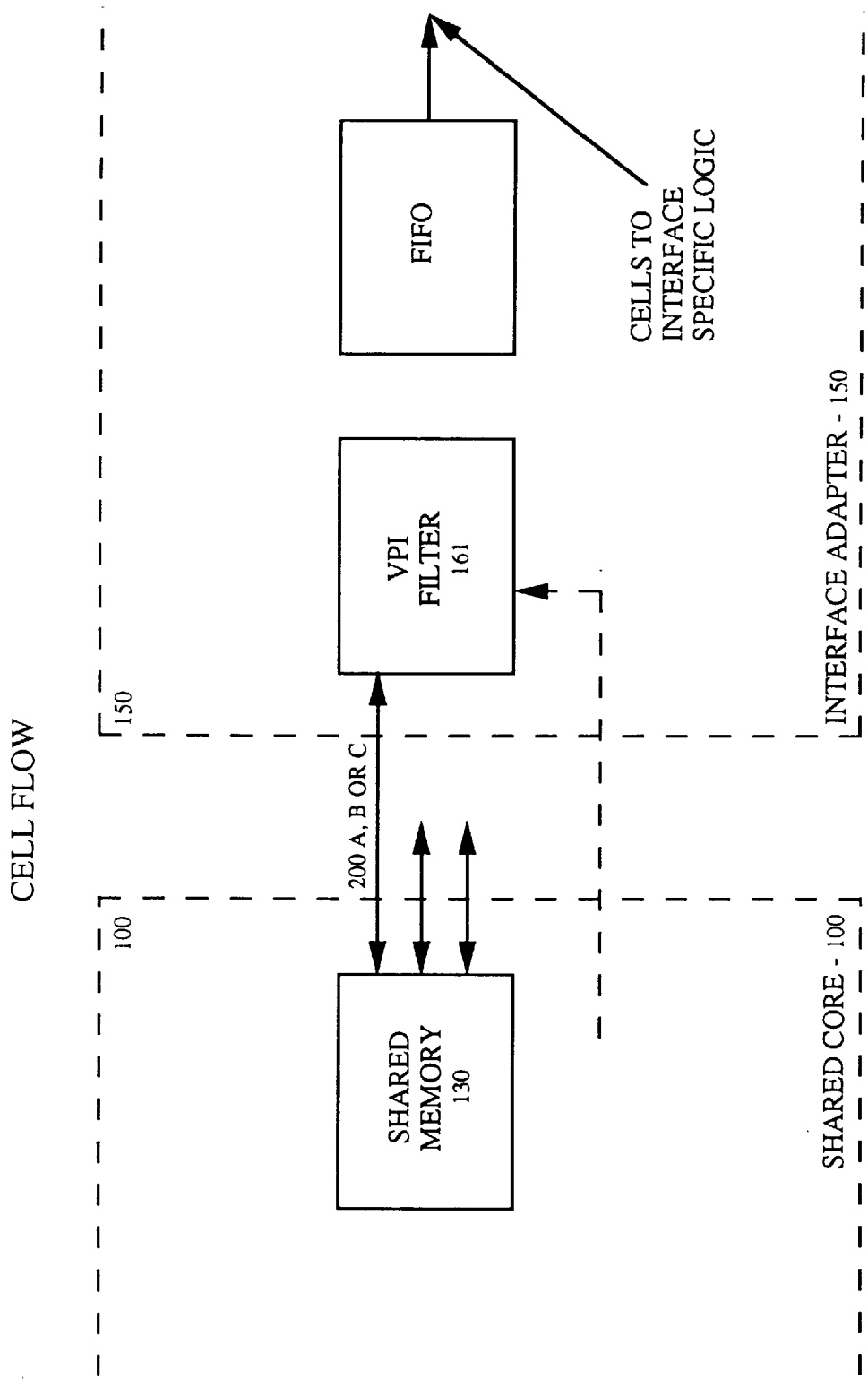
FIG. 25 is a block diagram showing the data cell flow between an interface adapter to the switch core of the invention.

FIG. 25 shows the cell flow from the interface adapter 150 to the switch core 100. Cells flow on the cell bus 200. As shown in FIG. 1, that bus is bidirectional. There are transmit buses for carrying cells going from the switch core to the interface adapter. In the switch core 100 in FIG. 1, and in FIG. 25, the shared memory 130 is shown. Part of the shared memory is an output onto each of the three buses 200A, 200B, and 200C. Each one of the interface adapters in the system can be connected electrically to a selected one of those three buses 200A, 200B, or 200C. The interface adapter 150 is configured by the processor 140 of the switch core 100 to accept cells only on the selected one of those three buses. Electrically, it can be configured to select any one of those three buses, but in a preferred embodiment, only one of the buses can be used. The configuration is established through the switch core processor and an initialization process, which is done across the extended processor bus 220 (FIG. 1). Once one of the cell buses has been selected, data will always flow from the shared memory to the interface adapter on that bus unless and until reconfigured. Each interface adapter is configured to accept cells on one bus during the overall system initialization and ongoing maintenance by the switch core processor 140.

Cells coming from the interface adapter shared memory 130 are coded in the format of a header which contains a VPI field and other fields (of a total length of four bytes) and a pay load (of forty-eight bytes), which contains the user data. The header information is used, in part, for determining how the cells are processed through the pathway of the cell bus 200 between the shared memory and the interface adapters. Since multiple interface adapters can be connected to the same bus, each interface adapter must have a capability to pass only those cells which are designated to be received by another interface adapter.

Each interface adapter 150 has a circuit called a VPI filter. The VPI filter is shown in FIG. 1 as 161, and in FIG. 25 as 161. The VPI filter process utilizes a look-up table. The look-up table is configured by the switch core processor during power up of the system, or whenever an interface adapter is initially started. The sole purpose of the VPI filter is to either accept or reject cells received on the cell bus 200 based upon the setting of the filter bit. The VPI can have up to twelve bits to determine it's value, giving a VPI value range from zero to 4,095. There are 4,096 unique elements in the VPI filter. Each element can be programmed as on or off. There's a unique correspondence between each VPI value and each element in the VPI filter indexed by the VPI value. As illustrated, the filter is implemented as a look-up table. When a VPI value's corresponding element is determined to be on, then the cell associated with that look-up process is allowed to pass onto the FIFO shown to the right of the VPI filter in FIG. 25.

When an element in the VPI filter is off, the cell that has been sent to that VPI filter is ignored. One or more other interface adapters could be programmed to accept that particular cell, but this one (with its filter bit value off) is programmed not to accept it.

Once the data has been received into the FIFO, as in FIG. 25, the interface specific logic has access to it (such as for purposes of ATM adaptation or to be forwarded to a physical port (e.g., ATM OC-3)). The entire cell (that came across the cell bus) is examined by the VPI filter, passed by the VPI filter, and then stored in the FIFO. This entire cell includes the header contents and the payload.

In general, the interface specific logic manipulates the cells (once they've been received) and utilizes the information contained in the header in order to determine and provide additional processing as necessary.

The VPI filter does not reduce the amount of processing that the interface specific logic has to do to with cells received by the interface specific logic. The VPI filter does limit the cell communication to the interface specific logic to those particular cells that are meant to be processed by that particular interface adapter.

Figure 26:
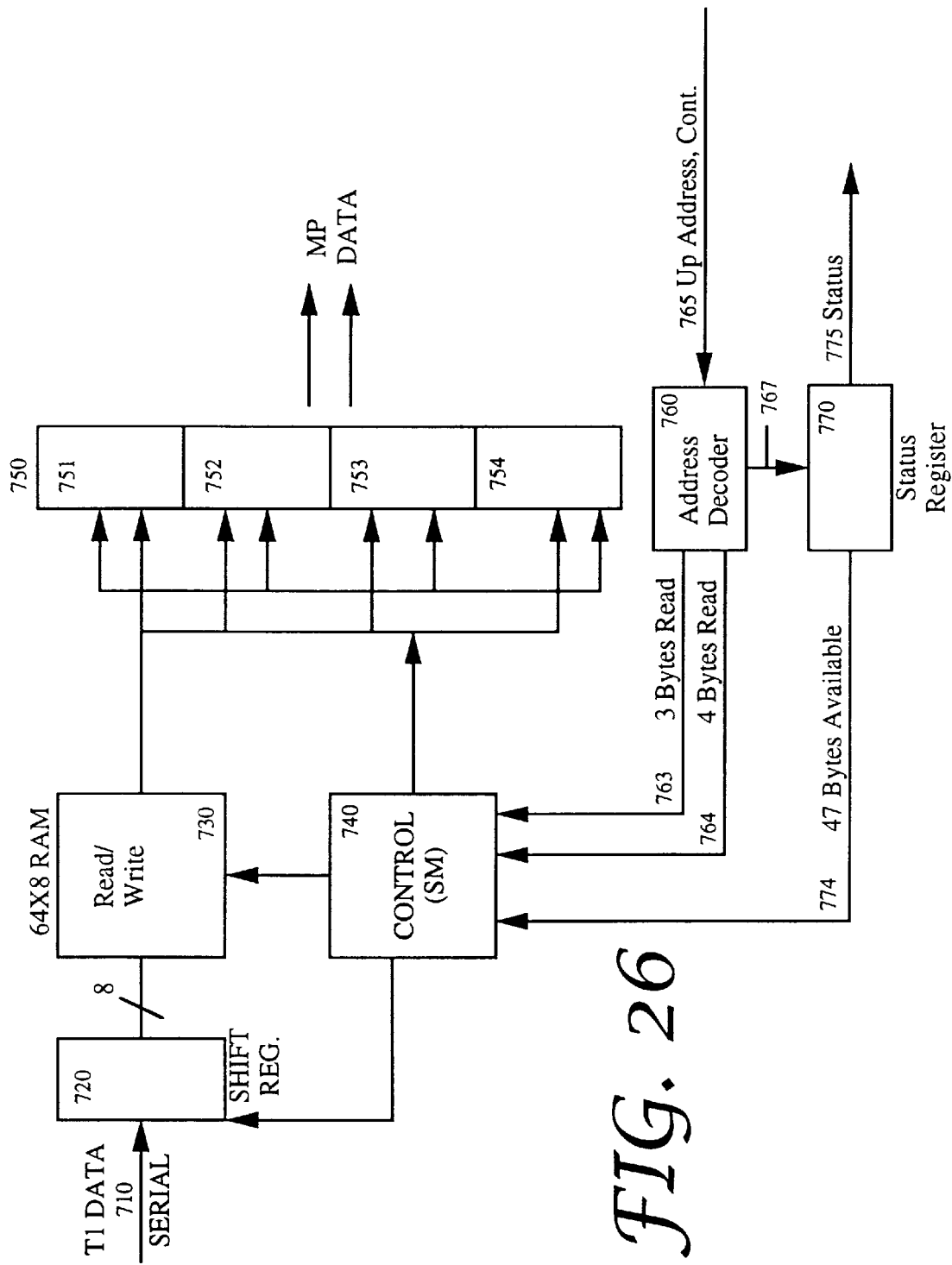
FIG. 26 is a block diagram of structure directed to converting serial constant data to ATM format.

Referring to FIG. 26, there is illustrated a novel method and structure for data stream conversion from a serial constant data rate data stream (e.g.,T1) to ATM format. The T1 data stream 710 is coupled to shift register 720, which accumulates 8-bits and outputs a byte at a time for storage in a read/write memory 730, illustrated as 64×8 bits. The read/write memory 730 is accessed to operate as a FIFO, outputting the first received bytes first, and storing either four or three bytes, one after another, in the register memory 750, stored in registers 751, 752, and 753 for the three byte output, and stored in registers 751, 752, 753, and 754 for the four byte output. The output from these registers 750 is coupled as four bytes of output data 755 for coupling to the interface specific logic processor (140 of FIG. 1). In one embodiment, this microprocessor is an Intel I-960 processor. The processor provides address and control signals 765 for coupling to an address decoder 760 which selects one of three modes: reading four bytes and providing a four byte read signal 764; reading three bytes and providing a three byte read signal 763; and a request for status read 767. The three-byte read and four-byte read address select signals 763, 764 are coupled to the control state machine 740, which synchronizes loading of and output from the shift register 720, reading and writing of the RAM 730, and thus provides for the selective writing of the data from the RAM 730 contents to either four registers or three registers, responsive to the respective control signal 764, 763, respectively. Additionally, the control state machine 740 outputs a data payload available signal 774 indicating that 47 bytes are available, indicating that the RAM 730 has the contents for one cell available for mapping into the ATM cell format for storage in the switch core using AAL1 adaptation processing.

The processor can request a status reading responsive to sending an address and control signal 765 to the address decoder 760 which sends a select signal 767 to the status register 770 which outputs a status signal 775 indicating the availability of a complete cell's contents.

The processor determines when to read four bytes and when to read three bytes by virtue of what address the microprocessor is reading from or outputting to the address decoder 760. Upon receiving a status signal 775 that there are forty-seven bytes available, the microprocessor begins reading first a three-byte read, and then eleven four-byte reads, until all forty-seven bytes have been read out from the RAM 730 via the register 750. The RAM 730 is configured as sixty-four bytes as described, even though there are only forty-seven bytes being transferred during one cell construction to the processor. This extra capacity allows for elasticity and provides a buffer for the additional storage requirements which can occur if the processor is delayed in restarting the process for the subsequent forty-seven bytes extraction from the RAM 730 and register 750.

Figure 27:
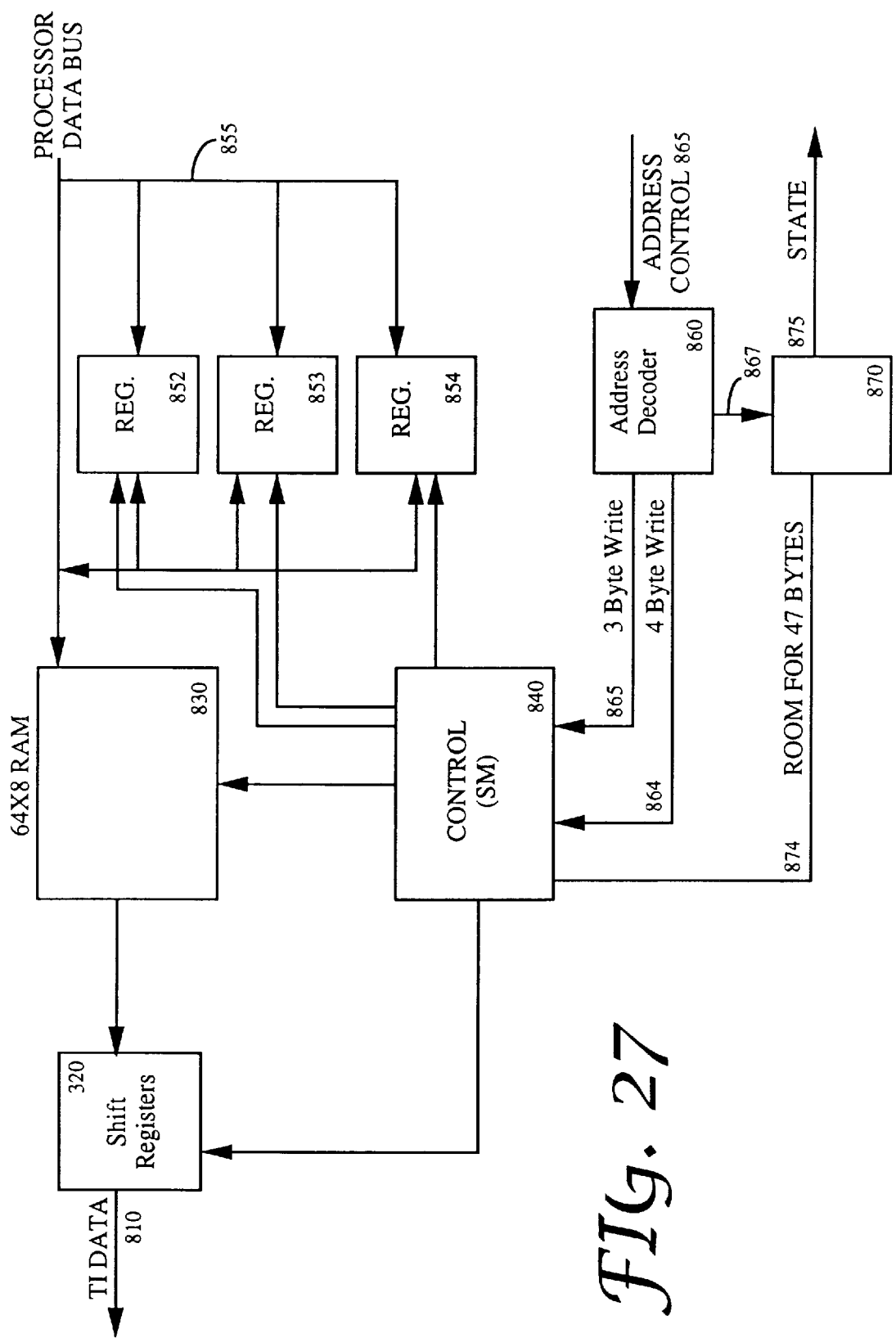
FIG. 27 provides a block diagram to show data flow from the interface specific subsystem to be output as T1 data.

As illustrated in FIG. 27, a separate circuit is provided for providing data output from the interface specific subsystem 152 processor to be output for compatibility with the T1 protocol as a constant data rate serial data stream. When a cell is transferred via the cell bus 200 to the interface adapter 150, the processor on the interface specific subsystem provides an address and control signal 865 to an address decoder, and provides corresponding data on a microprocessor data bus 855. The data, as illustrated, is thirty-two bits, or four bytes, in width. The least significant byte is directly written to the RAM 830 from the microprocessor data bus 855, without going through the intermediate registers 850 (852, 853, 854), but still synchronized responsive to the address decoder 860 responsive to the address and control signals 865, and responsive to the control state machine 840, which is responsive to the three-byte write signal 863 and the four-byte write select signal 864 output from the address decoder 860. The most significant three bytes of the four-byte output on the data bus, are buffered and latched in the registers 852, 853, 854, from least significant to most significant, and responsive to the control state machine 840, which registers output their contents to the memory 830, selectively providing output from all three registers (852, 853, 854) for a four-byte write, and only from registers 852, 853 for the three-byte write.

The control state machine 840 also provides a status signal output 874 indicating there is room for forty-seven bytes to be written into the RAM 830, coupled to a status register 870, which can be read by the microprocessor by providing address and control signals 865 to the address decoder 860, which provides a status read select signal 867, causing a status output 875 to be output to the microprocessor indicating that there is room for the forty-seven bytes.

The output of the RAM 830 is cycled in a FIFO manner, responsive to the control state machine 840, to selectively output one byte at a time, first in, first out fashion, for coupling to a shift register 820, which performs parallel to serial conversion to provide a constant rate serial data stream 810 of T1 data for output therefrom. The shift register 820 is loaded responsive to the control state machine 840, and is clocked at a rate determined by a T1 clock signal, which can be provided from any one of a number of sources, including from the T1 data source in, or from an internal clock within the system.

Referring to FIG. 28, a shared memory record format for storing ATM cells is shown. Sixteen 32bit words are allocated for storing each ATM cell. The first word is the new header, and the format varies depending on whether the interface is UNI or NNI. For a UNI interface, word zero is allocated as follows: bits 28–31 are allocated for storing the GFC, bits 20–27 are allocated for storing the VPI, bits 4–19 are allocated for storing the VCI, and bits 0–4 are allocated for storing the PTI and CLP. For an NNI interface, word zero is allocated as follows: bits 20–31 are allocated for storing the VPI, bits 4–19 are allocated for storing the PTI and CLP. Words 1–12 are allocated for storing the cell payload and words 13–15 are reserved.

Referring to FIG. 29, a processor transmit queue (PTQ) record format is shown. Word one of the PTQ two word format is the new header for the ATM cell, and the format varies depending on whether the interface is UNI or NNI. For a UNI interface, bits 28–31 are allocated for storing the GFC, bits 20–27 are allocated for storing the VPI, bits 4–19 are allocated for storing the VCI, and bits 0–3 are allocated for storing the PII and CLP. For an NNI interface, bits 20–31 are allocated for storing the VPI, bits 4–19 are allocated for storing the VCI, and bits 0–3 are allocated for storing the PTI and CLP. Word zero of the PTQ record format is organized as follows: bits 0–3 are reserved, bits 4–19 are allocated for the shared memory of the address of the cell being stored, and bits 20–31 are reserved. In operation, the core processor requests a record address from the shared memory. It then writes an ATM cell into that record in shared memory and writes pertinent header information into the PTQ register. The processor requests that the record be placed on a queue and the switch forwards the cell to the correct destination or destinations.

Referring to FIG. 30, a mapping of definitions of bits in the VPI Lookup Table to the bits in the VPI Lookup Table Records is shown. The VPI Lookup Table Record consists of two 32bit words. FIG. 30 has a first column labeled "Word" that indicates whether word 0 or word 1 is being defined. A second column labeled "Bits" indicates which bits are being defined, and a third column labeled "Description" provides the definition for the word and bits given in the first two columns, respectively.

Referring to FIG. 31, a mapping of definitions of bits in the VCI Lookup Table to the bits in the VCI Lookup Table Records is shown. The VCI Lookup Table Record consists of two 32bit words. FIG. 31 has a first column labeled "Word" that indicates whether word 0 or word 1 is being defined. A second column labeled "Bits" indicates which bits are being defined, and a third column labeled "Description" provides the definition for the word and bits given in the first two columns, respectively. In operation, the table is indexed using the received VCI value added to the VCI lookup table offset (from the VPI lookup table record).

Referring to FIG. 32, a two word 16bit per word Queue Record Definition is shown. Word 0 is organized as follows: bits 0–3 are reserved, bits 4–19 are allocated for storing the shared memory address of a cell, and bits 20–31 are reserved. The organization of word 1 depends on whether the interface is UNI or NNI compliant. For a UNI compliant interface, bits 0–3 are allocated for storing the PTI and CLP, bits 4–19 are allocated for storing the VCI, bits 20–27 are allocated for storing the VPI, and bits 28–31 are allocated for storing the GFC. For an NNI compliant interface, bits 0–3 are allocated for storing the PCI and CLP, bits 4–19 are allocated for storing the VCI, and bits 20–31 are allocated for storing the VPI.

Referring to FIG. 33, the relationship between an Adapter Slot location and an interrupt bit is described. A bit set at address 0×92001000 indicates that interface adapter in slot number 'N' has sent an interrupt, and a bit set at address 0×92001002 indicates that the interface adapter in slot number 'N+16' has sent an interrupt.

Referring to FIG. 34, a mapping between Interrupt 2 Flags/Masks register bits and their description is shown. In operation, a set bit indicates that an interrupt has occurred. Each bit can be reset (or set) by the core processor after the interrupt is processed. A 0 indicates that the event has not occurred, and a 1 indicates that the event has occurred.

Referring to FIG. 35, a mapping between the Management Information Block (MIB) element description and the element location in shared core is shown along with a mnemonic for the address location, where applicable. For instance, entry seven in the MIB table "Parity Error In Cell, Port 1" at address 0×90000018 defines the address in shared core for indicating a parity error for a port 1 cell. Similarly, entry one in the MIB table "Missing Cells, Port 1" at address 0×90000000 indicates that missing cells were detected in a transmission from Port 1.

Referring to FIG. 36, a table mapping ATM Bus Control Configuration Parameters to shared core memory addresses is shown. High and low priority list start addresses, list stop addresses, and list lengths for bus A, bus B, and bus C are shown. In addition, the mapping for initialized pointers, an alarm word, an alarmed slot, a bus control enable, a bus list address space, reset pointers A, B, and C high, reset pointers A, B, and C low, a read slot number of core, and an enable state machine is shown.

Referring to FIG. 37, a mapping of parameters and record size to addresses in a Common Logic Configuration PROM is shown. The parameters defining a system configuration are listed in the first column, the PROM address is listed in the second column, and the record size is listed in the third column.

Referring to FIG. 38, a mapping of Common Logic Controls (read/write) record size to shared core addresses is shown. The parameters defining the Common Logic Controls (read/write) is mapped to the given address as two half words or one half word.

Referring to FIG. 39, a mapping of the ATM Interface Adapter Parameters is shown. The first column indicates the ATM Interface Parameters, the address, and the record size.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A digital switching system for coupling with one or more specific physical interface external data signal sources regardless of signal protocol, said system comprising:

a switch core assembly comprising a shared memory subsystem and a shared bus subsystem comprising at least one arbitration control bus, a processor control bus, and a plurality of shared cell buses;

processor means for initializing the switch core assembly;

interface adapter means coupled to the shared bus subsystem and comprising an interface adapter assembly for coupling data between the external signal source and an assigned one of said cell buses and communicating the data via cells with said switch core assembly;

means for storing the cells from said interface adapter means within said shared memory subsystem;

means for outputting said stored cells from said shared memory subsystem on said assigned one of the cell buses to said interface adapter means; and wherein said switch core assembly further comprises at least one bus master arbitration subsystem and for arbitrating between said interface adapter means and said switch core assembly, and wherein said interface adapter means further comprises a bus slave arbitration subsystem;

wherein said interface adapter assembly comprises:

a common interface logic subsystem for coupling said interface adapter assembly to said switch core assembly via said shared bus subsystem;

a physical interface specific subsystem means for coupling from said physical interface specific subsystem to said common interface logic subsystem; and first means for translating externally coupled specific physical interface protocol signals into cell format, for storage in said shared memory subsystem via said shared bus subsystem; and second means for translating said stored cell formatted data into specific physical interface protocol signal formatted data for coupling to said external signal source.

2. The system as in claim 1, wherein said cells comprise asynchronous transfer mode (ATM) cells.

3. The system of claim 1, wherein the interface adapter means is further comprised of a plurality of the interface adapter assemblies, each of the plurality having a respective preassigned cell bus;

wherein said processing means selectively assigns a respective one of the cell buses to a respective one of the interface adapter assemblies.

4. The system of claim 3, wherein the processing means assigns a plurality of the interface adapter assemblies in common to at least one of the cell buses, the system further comprising bus arbitration means for coupling to each of the interface adapter assemblies, and to the shared memory, for managing access to each of the cell buses for each of the respective interface adapter assemblies coupled thereto.

5. The system as in claim 1, wherein for each of the cell buses, the bus master arbitration subsystem initializes and maintains a list corresponding to each of the cell buses, containing references to the bus slave arbitration subsystems that are attached to each of the respective ones of said cell buses.

6. The system as in claim 5, wherein each list maintained by the bus master arbitration subsystem is dynamically modified responsive to changes in configuration of the bus slave arbitration subsystems connected to the said cell buses.

7. The system as in claim 1, wherein each of the bus slave arbitration subsystems is programmable to dynamically change the assigned cell bus via which the respective bus slave arbitration subsystem communicates cell data.

8. The system of claim 1, wherein at least one of the plurality of interface adapter assemblies is assigned a higher priority status and is coupled in common with at least one of the interface adapter assemblies which is assigned a lower priority coupled via a common respective one of said cell buses; and wherein said bus master arbitration subsystem further comprises means for prioritizing, for each said cell bus, access to the respective cell buses for each of the interface adapter assemblies for transmittal of the cells via the respective cell bus, wherein the higher priority assemblies are preferentially granted access to that respective cell bus relative to the lower priority assemblies.

9. The system as in claim 8, wherein the bus master arbitration subsystem maintains a prioritized set of lists comprised of a higher priority assembly list and a lower priority assembly list for each interface adapter assembly attached to each cell bus;

wherein a polling interval is defined, during which the bus master arbitration subsystem polls the bus slave arbitration subsystem of each interface adapter assembly starting with the higher priority list until finding a bus slave arbitration subsystem that indicates a respective interface adapter assembly that has data to send and assigning that interface adapter to said cell bus; and wherein when said bus master arbitration subsystem finds no bus slave arbitration subsystem that has data to send, the bus master arbitration subsystem begins polling the next lower priority list until an interface adapter assembly indicates data to send and is assigned to the cell bus.

10. The system as in claim 9, wherein when said bus master arbitration subsystem has polled from all lists, said bus master arbitration subsystem stops polling for the current polling interval and begins polling again at the start of the next polling interval.

11. The system of claim 9, wherein said prioritized set of lists is maintained as circular, multi-tier lists;

wherein the master bus arbitration subsystem polls the slave bus arbitration subsystems via the arbitration control bus in a round robin manner, first for higher priority, then for lower priority ones of the interface adapter assemblies, wherein the master bus arbitration subsystem determines whether the interface adapter means has data to send, said bus master arbitration subsystem continuing to poll said lists, first higher priority, then lower priority, until a polled bus slave arbitration subsystem responds that it has data to send.

12. The system as in claim 9, wherein at the end of each polling interval, the bus master arbitration subsystem repeats the polling, beginning from where it left off in each list at the next position in the respective list.

13. The system as in claim 9, wherein the bus master arbitration subsystem performs the polling for a plurality of prioritized sets of lists, each set corresponding to a respective one of the cell buses.

14. The system of claim 1, wherein said switch core is further comprised of means for initializing each of said interface adapter assemblies.

15. The system as in claim 1, wherein each interface assembly has a unique address which the switch core assembly uses to communicate with said respective interface adapter assembly.

16. The system of claim 1, wherein said signal source comprises one of T1 carrier, Ethernet data, OC3 data, ATM, and DS3 data.

17. The system of claim 2, wherein said shared memory is organized into sixteen word blocks, wherein in at least one said sixteen word block only thirteen words are used to store ATM payload data, with the remaining three words of ATM header being unspecified;

wherein said processing means provides means for additionally regenerating said three words of ATM header on an as-needed basis.

18. The system of claim 2, wherein said interface adapter means is further comprised of means for segmenting and adapting said data signal source and assigning VPI and VCI values for communication as ATM cells to said switch core.

19. The system of claim 18, wherein said interface adapter means comprises source interface adapter means for inputting the data into the switch core, and destination interface adapter means for outputting the data from the switch core to an external destination responsive to the assigned VPI and VCI values.

20. A switching system comprising:

a shared core subsystem comprising:
shared memory for storing data;
shared processor means for processing said stored data;
a bus subsystem comprising a plurality of control buses and a plurality of data buses;
means for arbitrating usage of said plurality of data buses;

an interface subsystem comprising a plurality of distributed I/O adapters each comprising both a common interface to said switching system and a specific external interface subsystem;

wherein each said specific interface subsystem provides for communication with an external physical data source independently of the other subsystems; and wherein each said common interface is enabled to communicate with said shared core subsystem via said bus subsystem comprised of at least one of said plurality of data buses.

21. The system of claim 20, wherein said bus subsystem is further comprised of at least one control bus, wherein specific physical data interface signals are received by said specific interface subsystem and transferred to said common interface for translation to cells and for coupling therefrom to said shared core subsystem via one of said data buses, wherein said arbitration means communicates via one of the control buses.

22. The system of claim 20, wherein said shared processor additionally polls said I/O adapters to at least determine those that are active, said shared processor means further comprising:

means for storing a list of initialized I/O adapters;
means for comparing the polled I/O adapters to said list;
means for enabling said shared processor to initialize any said I/O adapters not on said list; and
means for updating said list according to the poll.

23. The interface system of claim 22, further comprising means for deleting from said list, each I/O adapter not coupled to the system.

24. The system as in claim 22, wherein said shared processor means responds at least one of (1) in real time to the insertion and removal of each of said I/O adapters, such that uninterrupted operation of said system is enabled, (2) at periodic intervals, and (3) as requested by a user.

25. The system of claim 20, wherein said shared processor means further comprises means for maintaining a common storage database of system configuration information, wherein at least a part of said configuration information is communicated to each of the plurality of I/O adapters.

26. The system as in claim 25, wherein said shared processor modifies the common storage database responsive to input from a source external to the shared core and the interface subsystem.

27. The system of claim 20, wherein said shared processor means initially enables and sets up address map tables and sets up configuration variable data for all of said I/O adapters which thereafter operate autonomously of one another, and wherein thereafter the shared processor means enables, disables, and modifies the configuration data and modifies the autonomous operation of each of said I/O adapters.

28. The system of claim 25, wherein said configuration information is stored in a non-volatile memory, and wherein the configuration information is compressed prior to storage and decompressed after retrieval.

29. A data communications system comprising:
   a plurality of distributed I/O adapters;
   a shared core comprising:
      a shared memory subsystem for storing cell data;
      a shared processor for at least managing setup, initialization, monitoring, and management of communication between selected ones of said I/O adapters;
      a plurality of shared core buses, comprising multiple cell buses, providing mutually exclusive means for commonly coupling said I/O adapters; and
      shared bus arbitration means for managing communication via said core buses between said coupled I/O adapters and said shared core.

30. The system of claim 29, wherein at least one said I/O adapter further comprises an external physical specific interface subsystem and a common shared interface subsystem;
   wherein said common shared interface subsystem comprises means for coupling and respective I/O adapter to said shared core buses and said shared core thereby providing communications therebetween;
   said external physical specific interface subsystem comprising means for coupling and interfacing with external data received in a first protocol format and means for translating said received data from said first protocol format into data having a shared memory format for communication with the shared core via the shared core buses.

31. The system as in claim 30, wherein a processor subsystem controls said data flow control mechanism via said processor bus, said data control mechanism comprising:
   a first register having an output coupled to a first counter;
   a second register having an output coupled to a second counter;
   a third register having an output coupled to a third counter;
   a fourth register having an output coupled to a fourth counter; and
   wherein an output of said first counter reloads said second counter, an output of said third counter reloads said fourth counter, wherein said second and fourth counters each provide a control output to control data flow.

32. The system of claim 31, wherein said flow control mechanism further comprises means for decrementing said counters, wherein when said first counter decrements to zero, said second counter resets to a count value of said second register and each time data is placed on a cell bus, said second counter is decremented such that when said second counter is decremented to zero, data flow onto said cell bus is blocked by said control output.

33. A data communications interface comprising:
   a switch core comprising:
      a terminal interface subsystem;
      a first bus arbitration subsystem;
      a processor subsystem;
      a shared memory subsystem; and
      a back plane subsystem comprising:
         an arbitration control bus coupled to the first bus arbitration system;
         a processor control bus coupled to the processor subsystem; and
         a data cell bus subsystem coupled to the shared memory subsystem,
   said cell bus subsystem comprising a plurality of cell buses, each of which is operationally independent of the other;
   a plurality of interface adapters, each comprising a common core bus interface coupled to the back plane subsystem, said common core bus interface comprising a second bus arbitration subsystem coupled to the arbitration control bus and a data cell flow management subsystem;
   means for providing data from a plurality of interface adapters representing multiple communications protocols.
      wherein each of said interface adapters is further comprised of (1) an interface specific subsystem for coupling to an external source of data and (2) means for transforming the data from the multiple communications protocols into a shared memory protocol, wherein the data transformed into the shared memory protocol is communicated via one of the cell buses and is stored in the shared memory subsystem;
      wherein said first bus arbitration subsystem is further comprised of slot ID means for providing a unique identity signal for each of the interface adapters;
      wherein said first and second bus arbitration subsystems communicate via the arbitration bus; and
      wherein said first bus arbitration subsystem maintains a slot ID map for controlling communications over said data cell bus subsystem.

34. The system as in claim 33, wherein the shared core utilizes the processor bus to communicate configuration information to respective ones of the I/O adapters.

35. The system as in claim 33, wherein the backplane subsystem has a plurality of addressable slot locations, each having a unique address; and
   wherein the slot ID means is responsive to placement of the respective I/O adaptor into one of the addressable slots.

36. The system as in claim 33, wherein said processor subsystem determines which one of the interface adapters is present and coupled to the backplane subsystem, wherein said processor subsystem provides for allocation of configuration tables in said shared memory, said processor subsystem providing means for storing initialization information comprising data for the configuration tables corresponding to attached ones of said interface adapters, initially responsive to default initialization information, and thereafter modifies the initialization information in said configuration tables responsive to operation of the system.

37. The system as in claim 36, further comprising a management interface, said management interface comprising means for permitting alteration of said configuration table for each said interface adapter in response to an external input.

38. The system as in claim 36, wherein said processor modifies said configuration table responsive to a change in status of a corresponding one of the interface adapters.

39. The system as in claim 36, wherein said configuration table comprises setup information corresponding to at least one of (i) the interface specific subsystem, (ii) the operation of the common core bus interface, and (iii) the operation of the shared memory subsystem.

40. The system as in claim 39, where said configuration table further comprises a VPI and VCI translation table.

* * * * *